United States Patent
Arayasantiparb et al.

(10) Patent No.: US 7,707,024 B2
(45) Date of Patent: *Apr. 27, 2010

(54) METHOD, SYSTEM, AND APPARATUS FOR CONVERTING CURRENCY VALUES BASED UPON SEMANTICALLY LABELED STRINGS

(75) Inventors: Athapan Arayasantiparb, Redmond, WA (US); Martin Vanko, Dublin (IE); Mohamed A. Abbar, Kirkland, WA (US); Thomas G. Moore, Duvall, WA (US)

(73) Assignee: Microsoft Corporation, Redmond, WA (US)

( * ) Notice: Subject to any disclaimer, the term of this patent is extended or adjusted under 35 U.S.C. 154(b) by 872 days.

This patent is subject to a terminal disclaimer.

(21) Appl. No.: 10/155,680

(22) Filed: May 23, 2002

(65) Prior Publication Data

US 2003/0220795 A1 Nov. 27, 2003

(51) Int. Cl.
*G06F 17/28* (2006.01)
(52) U.S. Cl. .................. 704/5; 704/4; 704/270
(58) Field of Classification Search .............. 704/4, 704/270, 5; 715/264
See application file for complete search history.

(56) References Cited

U.S. PATENT DOCUMENTS

| | | | |
|---|---|---|---|
| 4,674,065 A | 6/1987 | Lange et al. | 364/900 |
| 4,868,750 A | 9/1989 | Kucera et al. | 711/2 |
| 5,020,019 A | 5/1991 | Ogawa | 364/900 |
| 5,128,865 A | 7/1992 | Sadler | 704/2 |
| 5,159,552 A | 10/1992 | van Gasteren et al. | 704/1 |
| 5,267,155 A | 11/1993 | Buchanan et al. | 364/419.14 |
| 5,287,448 A | 2/1994 | Nicol et al. | 715/707 |
| 5,297,039 A | 3/1994 | Kanaegami et al. | 707/5 |
| 5,317,546 A | 5/1994 | Balch et al. | 368/9 |
| 5,337,233 A | 8/1994 | Hofert et al. | 364/419.14 |

(Continued)

FOREIGN PATENT DOCUMENTS

CA       2 246 920 A1    3/2000

(Continued)

OTHER PUBLICATIONS

Hewkin, "Smart Tags-the Distributed-Memory Resolution", IEE Review, Jun. 22, 1989, pp. 203-206.

(Continued)

*Primary Examiner*—Angela A Armstrong
(74) *Attorney, Agent, or Firm*—Merchant & Gould

(57) ABSTRACT

A method, system, and apparatus are provided for converting currency values between types of currency. When a string of text is entered into an application program, the string is analyzed to determine whether the string of text includes a currency value. If the string of text includes a currency value, the value is semantically labeled with schema information that identifies the type of currency associated with the value. When a selection is received of the currency value, a list of actions may be provided identifying conversion options available for the value. One of the conversion options may then be selected resulting in the conversion of the selected currency value to the destination type of currency identified by the selected action. The converted currency value may then be inserted into the string of text to replace the selected currency value along with a currency notation corresponding to the destination currency value.

18 Claims, 12 Drawing Sheets

U.S. PATENT DOCUMENTS

| | | | | |
|---|---|---|---|---|
| 5,341,293 | A | 8/1994 | Vertelney et al. | 715/530 |
| 5,351,190 | A | 9/1994 | Kondo | 364/419.08 |
| 5,386,564 | A | 1/1995 | Shearer et al. | 395/650 |
| 5,392,386 | A | 2/1995 | Chalas | 395/155 |
| 5,418,902 | A * | 5/1995 | West et al. | 715/503 |
| 5,446,891 | A | 8/1995 | Kaplan et al. | 395/600 |
| 5,522,089 | A | 5/1996 | Kikinis et al. | 710/73 |
| 5,535,323 | A | 7/1996 | Miller et al. | 715/707 |
| 5,541,836 | A | 7/1996 | Church et al. | 704/7 |
| 5,546,521 | A | 8/1996 | Martinez | 715/711 |
| 5,581,684 | A | 12/1996 | Dudzik et al. | 715/708 |
| 5,596,700 | A | 1/1997 | Darnell et al. | 715/512 |
| 5,617,565 | A | 4/1997 | Augenbraun et al. | 395/604 |
| 5,625,783 | A | 4/1997 | Ezekiel et al. | 395/352 |
| 5,627,567 | A | 5/1997 | Davidson | 345/173 |
| 5,627,958 | A | 5/1997 | Potts et al. | 715/708 |
| 5,634,019 | A | 5/1997 | Koppolu et al. | 715/744 |
| 5,640,560 | A | 6/1997 | Smith | 395/615 |
| 5,657,259 | A | 8/1997 | Davis et al. | 364/715.03 |
| 5,685,000 | A | 11/1997 | Cox | 704/9 |
| 5,708,825 | A | 1/1998 | Sotomayor | 395/762 |
| 5,715,415 | A | 2/1998 | Dazey et al. | 715/708 |
| 5,717,923 | A | 2/1998 | Dedrick | 395/613 |
| 5,752,022 | A | 5/1998 | Chiu et al. | 395/610 |
| 5,761,689 | A | 6/1998 | Rayson et al. | 707/533 |
| 5,764,794 | A | 6/1998 | Perlin | 382/186 |
| 5,765,156 | A | 6/1998 | Guzak et al. | 707/100 |
| 5,781,189 | A | 7/1998 | Holleran et al. | 715/826 |
| 5,781,904 | A | 7/1998 | Oren et al. | 707/100 |
| 5,794,257 | A | 8/1998 | Liu et al. | 707/501 |
| 5,799,068 | A | 8/1998 | Kikinis et al. | 379/93.06 |
| 5,802,253 | A | 9/1998 | Gross et al. | 395/51 |
| 5,802,262 | A | 9/1998 | Van De Vanter | 395/180 |
| 5,802,299 | A | 9/1998 | Logan et al. | 395/200.48 |
| 5,802,530 | A | 9/1998 | van Hoff | 707/513 |
| 5,805,911 | A | 9/1998 | Miller | 395/796 |
| 5,809,318 | A | 9/1998 | Rivette et al. | 715/512 |
| 5,815,830 | A | 9/1998 | Anthony | 707/6 |
| 5,818,447 | A | 10/1998 | Wolf et al. | 715/752 |
| 5,821,931 | A | 10/1998 | Berquist et al. | 715/784 |
| 5,822,539 | A | 10/1998 | van Hoff | 395/200.66 |
| 5,822,720 | A | 10/1998 | Bookman et al. | 704/3 |
| 5,826,025 | A | 10/1998 | Gramlich | 395/200.47 |
| 5,832,100 | A | 11/1998 | Lawton et al. | 382/100 |
| 5,845,077 | A | 12/1998 | Fawcett | 709/221 |
| 5,855,007 | A | 12/1998 | Jovicic et al. | 705/14 |
| 5,859,636 | A | 1/1999 | Pandit | 345/335 |
| 5,872,973 | A | 2/1999 | Mitchell et al. | 395/685 |
| 5,875,443 | A | 2/1999 | Nielsen | 707/2 |
| 5,877,757 | A | 3/1999 | Baldwin et al. | 715/705 |
| 5,884,266 | A | 3/1999 | Dvorak | 704/270.1 |
| 5,892,919 | A | 4/1999 | Nielsen | 395/200.58 |
| 5,893,073 | A | 4/1999 | Kasso et al. | 705/8 |
| 5,893,132 | A | 4/1999 | Huffman et al. | 715/201 |
| 5,895,461 | A | 4/1999 | De La Huerga et al. | 707/1 |
| 5,896,321 | A | 4/1999 | Miller et al. | 365/189.01 |
| 5,900,004 | A | 5/1999 | Gipson | 707/530 |
| 5,907,852 | A | 5/1999 | Yamada | 715/541 |
| 5,913,214 | A | 6/1999 | Madnick et al. | 707/10 |
| 5,920,859 | A | 7/1999 | Li | 707/5 |
| 5,924,099 | A | 7/1999 | Guzak et al. | 707/100 |
| 5,933,139 | A | 8/1999 | Feigner et al. | 715/708 |
| 5,933,140 | A | 8/1999 | Strahorn et al. | 715/712 |
| 5,933,498 | A | 8/1999 | Schneck et al. | 705/54 |
| 5,940,614 | A | 8/1999 | Allen et al. | 717/120 |
| 5,944,787 | A | 8/1999 | Zoken | 709/206 |
| 5,946,647 | A | 8/1999 | Miller et al. | 704/9 |
| 5,948,061 | A | 9/1999 | Merriman et al. | 709/219 |
| 5,956,681 | A | 9/1999 | Yamakita | 704/260 |
| 5,974,413 | A | 10/1999 | Beauregard et al. | 70/76 |
| 5,987,480 | A | 11/1999 | Donohue et al. | 715/501.1 |
| 5,991,719 | A | 11/1999 | Yazaki et al. | 794/251 |
| 5,995,756 | A | 11/1999 | Hermann | 395/712 |
| 6,006,265 | A | 12/1999 | Rangan et al. | 709/226 |
| 6,006,279 | A | 12/1999 | Hayes | 719/328 |
| 6,014,616 | A | 1/2000 | Kim | 704/8 |
| 6,018,761 | A | 1/2000 | Uomini | 706/206 |
| 6,028,605 | A | 2/2000 | Conrad et al. | 345/354 |
| 6,029,135 | A | 2/2000 | Krasle | 704/275 |
| 6,029,171 | A | 2/2000 | Smiga et al. | 707/102 |
| 6,031,525 | A | 2/2000 | Perlin | 345/173 |
| 6,052,531 | A | 4/2000 | Waldin et al. | 717/170 |
| 6,061,516 | A | 5/2000 | Yoshikawa et al. | 717/109 |
| 6,067,087 | A | 5/2000 | Krauss et al. | 715/762 |
| 6,072,475 | A | 6/2000 | Van Ketwich | 345/173 |
| 6,073,090 | A | 6/2000 | Fortune et al. | 704/8 |
| 6,085,201 | A | 7/2000 | Tso | 707/505 |
| 6,088,711 | A | 7/2000 | Fein et al. | 715/523 |
| 6,092,074 | A | 7/2000 | Rodkin et al. | 707/102 |
| 6,108,640 | A | 8/2000 | Slotznick | 705/26 |
| 6,108,674 | A | 8/2000 | Murakami et al. | 707/515 |
| 6,112,209 | A | 8/2000 | Gusack | 707/101 |
| 6,121,968 | A | 9/2000 | Arcuri et al. | 345/352 |
| 6,122,647 | A | 9/2000 | Horowitz et al. | 707/513 |
| 6,126,306 | A | 10/2000 | Ando | 364/419.02 |
| 6,137,911 | A | 10/2000 | Zhilyaev | 382/225 |
| 6,141,005 | A | 10/2000 | Hetherington et al. | 715/866 |
| 6,151,643 | A | 11/2000 | Cheng et al. | 710/36 |
| 6,154,738 | A | 11/2000 | Call | 707/4 |
| 6,167,469 | A | 12/2000 | Safai et al. | 710/62 |
| 6,167,523 | A | 12/2000 | Strong | 726/21 |
| 6,167,568 | A | 12/2000 | Gandel et al. | 717/176 |
| 6,173,316 | B1 | 1/2001 | De Boor et al. | 709/218 |
| 6,182,029 | B1 | 1/2001 | Friedman | 704/9 |
| 6,185,550 | B1 | 2/2001 | Snow et al. | 707/1 |
| 6,185,576 | B1 | 2/2001 | McIntosh | 707/200 |
| 6,199,046 | B1 * | 3/2001 | Heinzle et al. | 705/1 |
| 6,199,081 | B1 | 3/2001 | Meyerzon et al. | 715/513 |
| 6,208,338 | B1 | 3/2001 | Fischer et al. | 715/705 |
| 6,219,698 | B1 | 4/2001 | Iannucci et al. | 709/221 |
| 6,246,404 | B1 | 6/2001 | Feigner et al. | 715/708 |
| 6,262,728 | B1 | 7/2001 | Alexander | 345/440.1 |
| 6,272,074 | B1 | 8/2001 | Winner | 368/10 |
| 6,272,505 | B1 | 8/2001 | De La Huerga | 707/501 |
| 6,282,489 | B1 | 8/2001 | Bellesfield et al. | 701/201 |
| 6,291,785 | B1 | 9/2001 | Koga et al. | 209/584 |
| 6,292,768 | B1 | 9/2001 | Chan | 704/1 |
| 6,295,061 | B1 | 9/2001 | Park et al. | 715/764 |
| 6,297,822 | B1 | 10/2001 | Feldman | 715/705 |
| 6,300,950 | B1 | 10/2001 | Clark et al. | 715/705 |
| 6,308,171 | B1 | 10/2001 | De La Huerga | 707/3 |
| 6,311,152 | B1 | 10/2001 | Bai et al. | 704/9 |
| 6,311,177 | B1 | 10/2001 | Dauerer et al. | 707/2 |
| 6,311,194 | B1 | 10/2001 | Sheth et al. | 707/505 |
| 6,320,496 | B1 | 11/2001 | Sokoler et al. | 340/470.1 |
| 6,323,853 | B1 | 11/2001 | Hedloy | 345/339 |
| 6,336,125 | B2 | 1/2002 | Noda et al. | 715/531 |
| 6,336,131 | B1 | 1/2002 | Wolfe et al. | 709/203 |
| 6,338,059 | B1 | 1/2002 | Fields et al. | 707/4 |
| 6,339,436 | B1 | 1/2002 | Amro et al. | 715/714 |
| 6,339,755 | B1 | 1/2002 | Hetherington et al. | 704/8 |
| 6,347,398 | B1 | 2/2002 | Parthasarathy et al. | 717/170 |
| 6,349,295 | B1 | 2/2002 | Tedesco et al. | 707/3 |
| 6,353,926 | B1 | 3/2002 | Parthesarathy et al. | 717/11 |
| 6,381,742 | B2 | 4/2002 | Forbes et al. | 717/176 |
| 6,382,350 | B1 | 5/2002 | Jezewski et al. | 181/290 |
| 6,392,668 | B1 | 5/2002 | Murray | 715/38 |
| 6,396,515 | B1 | 5/2002 | Hetherington et al. | 715/762 |
| 6,401,067 | B2 | 6/2002 | Lewis et al. | 704/275 |
| 6,408,323 | B1 | 6/2002 | Kobayashi et al. | 709/100 |
| 6,413,100 | B1 | 7/2002 | Dickmeyer et al. | 434/322 |
| 6,415,304 | B1 | 7/2002 | Horvitz | 715/205 |
| 6,421,678 | B2 | 7/2002 | Smiga et al. | 707/102 |
| 6,424,979 | B1 | 7/2002 | Livingston et al. | 715/511 |

| Patent | Kind | Date | Inventor | Class |
|---|---|---|---|---|
| 6,434,567 | B1 | 8/2002 | De La Huerga | 707/102 |
| 6,438,545 | B1 | 8/2002 | Beauregard et al. | 707/6 |
| 6,441,753 | B1 | 8/2002 | Montgomery | 341/34 |
| 6,442,545 | B1 | 8/2002 | Feldman et al. | 707/8 |
| 6,442,591 | B1 | 8/2002 | Haynes et al. | 709/206 |
| 6,456,304 | B1 | 9/2002 | Angiulo et al. | 715/779 |
| 6,470,091 | B2 | 10/2002 | Koga et al. | 382/101 |
| 6,473,069 | B1 | 10/2002 | Gerpheide | 345/157 |
| 6,477,510 | B1 * | 11/2002 | Johnson | 705/30 |
| 6,480,860 | B1 | 11/2002 | Monday | 707/102 |
| 6,493,006 | B1 | 12/2002 | Gourdol et al. | 345/825 |
| 6,498,982 | B2 | 12/2002 | Bellesfield et al. | 701/202 |
| 6,510,504 | B2 | 1/2003 | Satyanarayanan | 711/170 |
| 6,516,321 | B1 | 2/2003 | De La Huerga | 707/102 |
| 6,519,557 | B1 | 2/2003 | Emens et al. | 704/8 |
| 6,519,603 | B1 | 2/2003 | Bays et al. | 707/102 |
| 6,546,433 | B1 | 4/2003 | Matheson | 709/318 |
| 6,553,385 | B2 | 4/2003 | Johnson et al. | 707/104.1 |
| 6,556,972 | B1 | 4/2003 | Bakis et al. | 704/277 |
| 6,556,984 | B1 | 4/2003 | Zien | 707/2 |
| 6,564,264 | B1 | 5/2003 | Creswell et al. | 709/245 |
| 6,571,241 | B1 | 5/2003 | Nosohara | 707/6 |
| 6,571,253 | B1 | 5/2003 | Thompson et al. | 707/103 R |
| 6,591,260 | B1 | 7/2003 | Schwarzhoff et al. | 707/2 |
| 6,595,342 | B1 | 7/2003 | Maritzen et al. | 194/212 |
| 6,601,075 | B1 | 7/2003 | Huang et al. | 707/104.1 |
| 6,604,099 | B1 | 8/2003 | Chung et al. | 707/3 |
| 6,615,131 | B1 | 9/2003 | Rennard et al. | 701/200 |
| 6,618,733 | B1 | 9/2003 | White et al. | 707/103 |
| 6,622,140 | B1 | 9/2003 | Kantrowitz | 707/5 |
| 6,623,527 | B1 | 9/2003 | Hamzy | 715/513 |
| 6,625,581 | B1 | 9/2003 | Perkowski | 705/27 |
| 6,629,079 | B1 | 9/2003 | Spiegel et al. | 705/26 |
| 6,631,519 | B1 | 10/2003 | Nicholson et al. | 717/169 |
| 6,636,880 | B1 | 10/2003 | Bera | 708/206 |
| 6,643,650 | B1 | 11/2003 | Slaughter et al. | 707/10 |
| 6,654,734 | B1 | 11/2003 | Mani et al. | 707/2 |
| 6,654,932 | B1 | 11/2003 | Bahrs et al. | 715/507 |
| 7,454,459 | B1 | 11/2003 | Kapoor et al. | 709/203 |
| 6,658,623 | B1 | 12/2003 | Schilit et al. | 715/513 |
| 6,687,485 | B2 | 2/2004 | Hopkins et al. | 434/350 |
| 6,694,307 | B2 | 2/2004 | Julien | 707/3 |
| 6,697,824 | B1 | 2/2004 | Bowman-Amuah | 707/229 |
| 6,697,837 | B1 | 2/2004 | Rodov | 709/203 |
| 6,708,189 | B1 | 3/2004 | Fitzsimons et al. | 707/205 |
| 6,715,144 | B2 | 3/2004 | Daynes et al. | 717/174 |
| 6,717,593 | B1 | 4/2004 | Jennings | 715/760 |
| 6,718,516 | B1 | 4/2004 | Claussen et al. | 715/513 |
| 6,728,679 | B1 | 4/2004 | Strubbe et al. | 704/270.1 |
| 6,732,090 | B2 | 5/2004 | Shanahan et al. | 707/3 |
| 6,732,361 | B1 | 5/2004 | Andreoli et al. | 719/313 |
| 6,741,994 | B1 | 5/2004 | Kang et al. | 707/102 |
| 6,742,054 | B1 | 5/2004 | Upton, IV | 710/6 |
| 6,745,208 | B2 | 6/2004 | Berg et al. | 707/201 |
| 6,766,326 | B1 | 7/2004 | Cena | 707/101 |
| 6,795,808 | B1 | 9/2004 | Strubbe et al. | 704/275 |
| 6,802,061 | B1 | 10/2004 | Parthasarathy et al. | 717/173 |
| 6,826,726 | B2 | 11/2004 | Hsing et al. | 715/513 |
| 6,829,631 | B1 | 12/2004 | Forman et al. | 709/202 |
| 6,845,499 | B2 | 1/2005 | Srivastava et al. | 717/100 |
| 6,857,103 | B1 | 2/2005 | Wason | 715/709 |
| 6,859,908 | B1 | 2/2005 | Clapper | 715/224 |
| 6,868,525 | B1 | 3/2005 | Szabo | 715/738 |
| 6,874,125 | B1 | 3/2005 | Carroll et al. | 715/705 |
| 6,874,143 | B1 | 3/2005 | Murray et al. | 717/173 |
| 6,880,129 | B1 | 4/2005 | Lee et al. | 715/763 |
| 6,883,137 | B1 | 4/2005 | Girardot et al. | 715/513 |
| 6,898,604 | B1 | 5/2005 | Ballinger et al. | 707/101 |
| 6,901,402 | B1 | 5/2005 | Corston-Oliver et al. | 701/101 |
| 6,904,560 | B1 | 6/2005 | Panda | 715/202 |
| 6,925,457 | B2 | 8/2005 | Britton et al. | 707/1 |
| 6,925,470 | B1 | 8/2005 | Sangudi et al. | 707/102 |
| 6,944,857 | B1 | 9/2005 | Glaser et al. | 717/173 |
| 6,948,133 | B2 | 9/2005 | Haley | 715/780 |
| 6,950,831 | B2 | 9/2005 | Haley | 707/104.1 |
| 6,950,982 | B1 | 9/2005 | Dourish | 715/512 |
| 6,957,385 | B2 | 10/2005 | Chan et al. | 715/504 |
| 6,963,867 | B2 | 11/2005 | Ford et al. | 707/3 |
| 6,964,010 | B1 | 11/2005 | Sharp | 715/507 |
| 6,975,983 | B1 | 12/2005 | Fortescue et al. | 704/9 |
| 6,976,090 | B2 | 12/2005 | Ben-Shaul et al. | 709/246 |
| 6,976,209 | B1 | 12/2005 | Storisteanu et al. | 715/512 |
| 6,981,212 | B1 | 12/2005 | Claussen et al. | 715/205 |
| 6,986,104 | B2 | 1/2006 | Green et al. | 715/523 |
| 6,990,654 | B2 | 1/2006 | Carroll, Jr. | 717/109 |
| 7,003,522 | B1 | 2/2006 | Reynar et al. | 707/10 |
| 7,013,289 | B2 | 3/2006 | Horn et al. | 705/26 |
| 7,024,658 | B1 | 4/2006 | Cohen et al. | 717/117 |
| 7,028,312 | B1 | 4/2006 | Merrick et al. | 719/330 |
| 7,032,174 | B2 | 4/2006 | Montero et al. | 715/257 |
| 7,039,859 | B1 | 5/2006 | Sundaresan | 715/229 |
| 7,051,076 | B2 | 5/2006 | Tsuchiya | 709/206 |
| 7,082,392 | B1 | 7/2006 | Butler et al. | 704/233 |
| 7,100,115 | B1 | 8/2006 | Yennaco | 715/748 |
| 7,113,976 | B2 | 9/2006 | Watanabe | 709/206 |
| 7,146,564 | B2 | 12/2006 | Kim et al. | 715/235 |
| 7,216,351 | B1 | 5/2007 | Maes | 719/328 |
| 7,237,190 | B2 | 6/2007 | Rollins et al. | 715/234 |
| 7,281,245 | B2 | 10/2007 | Reynar et al. | 717/173 |
| 7,302,634 | B2 | 11/2007 | Lucovsky et al. | 715/200 |
| 7,305,354 | B2 | 12/2007 | Rodriguez et al. | 705/26 |
| 7,325,194 | B2 * | 1/2008 | Moore et al. | 715/234 |
| 7,392,479 | B2 | 6/2008 | Jones et al. | 715/513 |
| 7,421,645 | B2 | 9/2008 | Reynar | 715/206 |
| 2001/0029605 | A1 | 10/2001 | Forbes et al. | 717/11 |
| 2001/0041328 | A1 | 11/2001 | Fisher | 434/157 |
| 2001/0042098 | A1 | 11/2001 | Gupta et al. | 709/206 |
| 2001/0049702 | A1 | 12/2001 | Najmi | 707/513 |
| 2001/0056461 | A1 | 12/2001 | Kampe et al. | 709/201 |
| 2002/0002590 | A1 | 1/2002 | King et al. | 709/206 |
| 2002/0003469 | A1 | 1/2002 | Gupta | 340/407.1 |
| 2002/0003898 | A1 | 1/2002 | Wu | 382/187 |
| 2002/0004803 | A1 | 1/2002 | Serebrennikov | 715/513 |
| 2002/0007309 | A1 | 1/2002 | Reynar | 705/14 |
| 2002/0023113 | A1 | 2/2002 | Hsing et al. | 707/513 |
| 2002/0023136 | A1 | 2/2002 | Silver et al. | 709/206 |
| 2002/0026074 | A1 | 2/2002 | Kuramochi | 707/104.1 |
| 2002/0029304 | A1 | 3/2002 | Reynar et al. | 709/332 |
| 2002/0035581 | A1 | 3/2002 | Reynar et al. | 715/513 |
| 2002/0038180 | A1 | 3/2002 | Bellesfield et al. | 701/202 |
| 2002/0065110 | A1 | 5/2002 | Enns et al. | 455/566 |
| 2002/0065891 | A1 | 5/2002 | Malik | 709/206 |
| 2002/0066073 | A2 | 5/2002 | Lienhard et al. | 717/105 |
| 2002/0078222 | A1 | 6/2002 | Compas et al. | 709/232 |
| 2002/0091803 | A1 | 7/2002 | Imamura et al. | 709/220 |
| 2002/0099687 | A1 | 7/2002 | Krishnaprasad et al. | 707/1 |
| 2002/0100036 | A1 | 7/2002 | Moshir et al. | 717/173 |
| 2002/0103829 | A1 | 8/2002 | Manning et al. | 707/513 |
| 2002/0104080 | A1 | 8/2002 | Woodard et al. | 717/176 |
| 2002/0110225 | A1 | 8/2002 | Cullis | 379/67.1 |
| 2002/0111928 | A1 | 8/2002 | Haddad | 707/1 |
| 2002/0120685 | A1 | 8/2002 | Srivastava et al. | 709/203 |
| 2002/0129107 | A1 | 9/2002 | Loughran et al. | 709/206 |
| 2002/0133523 | A1 | 9/2002 | Ambler et al. | 715/536 |
| 2002/0149601 | A1 | 10/2002 | Rajarajan et al. | 345/619 |
| 2002/0156774 | A1 | 10/2002 | Beauregard et al. | 707/3 |
| 2002/0156792 | A1 | 10/2002 | Gombocz et al. | 707/100 |
| 2002/0169802 | A1 | 11/2002 | Brewer et al. | 707/513 |
| 2002/0175955 | A1 | 11/2002 | Gourdol et al. | 345/821 |
| 2002/0178008 | A1 | 11/2002 | Reynar | 704/272 |
| 2002/0178182 | A1 | 11/2002 | Wang et al. | 715/501.1 |
| 2002/0184247 | A1 | 12/2002 | Jokela et al. | 707/204 |
| 2002/0188941 | A1 | 12/2002 | Cicciarelli et al. | 717/175 |
| 2002/0196281 | A1 | 12/2002 | Audleman et al. | 345/762 |
| 2002/0198909 | A1 | 12/2002 | Huynh et al. | 707/513 |
| 2003/0002391 | A1 | 1/2003 | Biggs | 368/82 |

| | | | |
|---|---|---|---|
| 2003/0005411 A1 | 1/2003 | Gerken | 717/120 |
| 2003/0009489 A1 | 1/2003 | Griffin | 707/500 |
| 2003/0014745 A1 | 1/2003 | Mah et al. | 717/170 |
| 2003/0025728 A1 | 2/2003 | Ebbo et al. | 345/744 |
| 2003/0046316 A1 | 3/2003 | Gergic et al. | 707/513 |
| 2003/0050911 A1 | 3/2003 | Lucovsky et al. | 707/1 |
| 2003/0051236 A1 | 3/2003 | Pace et al. | 717/177 |
| 2003/0056207 A1 | 3/2003 | Fischer et al. | 717/174 |
| 2003/0081791 A1 | 5/2003 | Erickson et al. | 380/282 |
| 2003/0083910 A1 | 5/2003 | Sayal et al. | 705/7 |
| 2003/0084138 A1 | 5/2003 | Tavis et al. | 709/223 |
| 2003/0097318 A1* | 5/2003 | Yu et al. | 705/35 |
| 2003/0101190 A1 | 5/2003 | Horvitz et al. | 707/100 |
| 2003/0101204 A1 | 5/2003 | Watson | 708/206 |
| 2003/0101416 A1 | 5/2003 | McInnes et al. | 715/513 |
| 2003/0106040 A1* | 6/2003 | Rubin et al. | 717/100 |
| 2003/0115039 A1 | 6/2003 | Wang | 704/4 |
| 2003/0121033 A1 | 6/2003 | Peev et al. | 717/175 |
| 2003/0126136 A1 | 7/2003 | Omoigui | 707/10 |
| 2003/0140308 A1 | 7/2003 | Murthy et al. | 715/500 |
| 2003/0154144 A1 | 8/2003 | Pokorny et al. | 705/28 |
| 2003/0158841 A1 | 8/2003 | Britton et al. | 707/3 |
| 2003/0158851 A1 | 8/2003 | Britton et al. | 707/100 |
| 2003/0167445 A1 | 9/2003 | Su et al. | 715/513 |
| 2003/0172343 A1 | 9/2003 | Leymaster et al. | 715/500 |
| 2003/0177341 A1 | 9/2003 | Devillers | 712/227 |
| 2003/0182391 A1 | 9/2003 | Leber et al. | 709/217 |
| 2003/0192040 A1 | 10/2003 | Vaughan | 717/173 |
| 2003/0195937 A1 | 10/2003 | Kircher et al. | 709/207 |
| 2003/0212527 A1 | 11/2003 | Moore et al. | 702/179 |
| 2003/0220795 A1 | 11/2003 | Araysantiparb et al. | 704/275 |
| 2003/0229593 A1 | 12/2003 | Raley et al. | 705/55 |
| 2003/0233330 A1 | 12/2003 | Raley et al. | 705/55 |
| 2004/0002939 A1 | 1/2004 | Arora et al. | 707/1 |
| 2004/0003389 A1 | 1/2004 | Reynar et al. | 717/178 |
| 2004/0006564 A1 | 1/2004 | Lucovsky et al. | 707/10 |
| 2004/0006741 A1 | 1/2004 | Radja et al. | 715/513 |
| 2004/0024875 A1 | 2/2004 | Horvitz et al. | 709/226 |
| 2004/0039990 A1 | 2/2004 | Bakar et al. | 715/505 |
| 2004/0044959 A1 | 3/2004 | Shanmugasundaram et al. | 715/513 |
| 2004/0068694 A1 | 4/2004 | Kaler et al. | 715/513 |
| 2004/0083218 A1 | 4/2004 | Feng | 707/100 |
| 2004/0133846 A1 | 7/2004 | Khoshatefeh et al. | 715/500 |
| 2004/0143581 A1 | 7/2004 | Bohannon et al. | 707/100 |
| 2004/0165007 A1 | 8/2004 | Shafron | 345/781 |
| 2004/0199861 A1 | 10/2004 | Lucovsky | 715/500 |
| 2004/0201867 A1 | 10/2004 | Katano | 358/1.15 |
| 2004/0236717 A1 | 11/2004 | Demartini et al. | 707/1 |
| 2005/0050164 A1 | 3/2005 | Burd et al. | 709/217 |
| 2005/0055330 A1 | 3/2005 | Britton et al. | 707/1 |
| 2005/0094830 A1 | 5/2005 | Nakas | 382/193 |
| 2005/0108195 A1 | 5/2005 | Yalovsky et al. | 707/1 |
| 2005/0120313 A1 | 6/2005 | Rudd et al. | 715/866 |
| 2005/0187926 A1 | 8/2005 | Britton et al. | 707/3 |
| 2006/0173674 A1 | 8/2006 | Nakajima et al. | 704/9 |

FOREIGN PATENT DOCUMENTS

| | | |
|---|---|---|
| EP | 0 364 180 A2 | 4/1990 |
| EP | 0481784 A2 | 4/1992 |
| EP | 0598511 A2 | 5/1994 |
| EP | 0872827 A2 | 10/1998 |
| EP | 0810520 B1 | 12/1998 |
| EP | 1093058 A1 | 4/2001 |
| EP | 1280068 A2 | 1/2003 |
| EP | 1361523 A2 | 11/2003 |
| EP | 1376392 A2 | 1/2004 |
| EP | 1 447 754 A1 | 8/2004 |
| EP | 1 452 966 A3 | 9/2004 |
| JP | 64-88771 | 4/1989 |
| JP | 05-174013 | 7/1993 |
| JP | 08-272662 | 10/1996 |
| JP | 09-138636 | 5/1997 |
| JP | 10-171827 | 6/1998 |
| JP | 2000-222394 | 8/2000 |
| JP | 2000-231566 | 8/2000 |
| JP | 2001-014303 | 1/2001 |
| JP | 2001-125994 | 5/2001 |
| JP | 2001-522112 | 11/2001 |
| JP | 2001-0350464 | 12/2001 |
| JP | 2002-041353 | 2/2002 |
| JP | 2002163250 A | 6/2002 |
| JP | 2002-222181 | 8/2002 |
| JP | 2003-141174 | 5/2003 |
| WO | WO 95/07510 A1 | 3/1995 |
| WO | WO 99/17240 A1 | 4/1999 |
| WO | WO 00/54174 A1 | 9/2000 |
| WO | WO 00/67117 | 11/2000 |
| WO | WO 00/73949 A1 | 12/2000 |
| WO | WO 01/18687 A1 | 3/2001 |
| WO | WO 01/37170 A2 | 5/2001 |
| WO | WO 01/186390 A2 | 11/2001 |
| WO | WO 02/99627 A1 | 1/2002 |
| WO | WO 02/15518 A2 | 2/2002 |
| WO | WO 02/42928 A1 | 5/2002 |
| WO | WO 2004/012099 A2 | 2/2004 |

OTHER PUBLICATIONS

Measuring Units Conversion Table—http://web.archie.org- 1997 Internet French Property, pp. 1-4.

IBM Technical Disclosure Bulletin, "National Language Support Enhancement for Culture-Specific Operations", Nov. 1, 1993, vol. 36, Issue 11, pp. 629-638.

Towers, J. Tarin, Visual Quickstart Guide: Dreamweaver 2 for Windows and Macintosh, 1999, Peachpit Press, pp. 150-151.

Driza, Scott, "Learn Word 2000 VBA Document Automation", Wordware Publishing Inc., 2001, 6 pp.

Cornell, Paul, "Developing Smart Tag DLLs", MSDN Library, http://msdn.microsoft.com/library/default.asp?url=/library/en-us/dnsmarttag/html/odc_smarttags.asp, Apr. 2001, pp. 8.

U.S. Appl. No. 10/183,317, filed Jun. 25, 2002, entitled "System and Method for Issuing a Message to a Program", Inventors: Sawicki et al.

U.S. Official Action dated Dec. 8, 2004 cited in U.S. Appl. No. 09/588,411.

U.S. Official Action dated Mar. 17, 2005 cited in U.S. Appl. No. 09/841,265.

U.S. Official Action dated Jul. 25, 2005 cited in U.S. Appl. No. 10/179,438.

U.S. Official Action dated Jun. 24, 2005 in U.S. Appl. No. 10/140,544.

U.S. Final Official Action dated Jun. 3, 2005 in U.S. Appl. No. 10/154,630.

Willisson, Pace, et al., "UNIX Man Pages: ispell," http://www.comp.lancs.ac.uk/computing/users/eiamjw/unix/chap8.html, http://www.physics.umn.edu/cgi-bin/man-cgi?spell, http://www.vorlesungen.uni-osnabrueck.de/informatik/shellscript/Html/Man/_Man_NeXT_html/html, http://duplex.hypermart.net/books.bsd/501-504.html, pp. 1-20.

Kuenning, Geoff, "International Ispell," Version 3.1.00, Oct. 8, 1993, http://www.rt.com/man/findaffix.1.html, http://www.csee.usf.edu/cgi-bin/man-cig?ispell, http://fmg-www.cs.ucla.edu/geoff/ispell.html, pp. 1-33.

Kuenning, Geoff, "Ispell, v. 3.1," http://theochem.ki.ku.dk/on_line_docs/ispell/ispell_1.html, pp. 1-6.

"UNIX Man Pages: sed," http://www.calpoly.edu/cgi-bin/man-cgi?spell+1, pp. 1-14.

McMahon, Lee E., "SED—A Non-Interactive Text Editor," Bell Laboratories, Murray Hill, New Jersey 07974, pp. 1-15.

Beitner, N.D.; Hall, W.; Goble, C.A., "Multimedia Support and Authoring in Microcosm: An Extended Model," Dept. of Electronics and Computer Science, Univ. of Southampton, Southampton SO17 IBJ, UK; Dept. of Computer Science, Univ. of Manchester, Oxford Road, Manchester MI3 9PL, UK, pp. 1-12.

IBM Corporation, "IBM Research Disclosure #368; Multimedia Hyperlinks Automatically Created For Reference Documents," *IBM Technical Disclosure* Bulletin, Jun. 1993, pp. 1-5.

*The Complete LINUX™ Operating System 5.2 Deluxe*, Red Hat,® Macmillian Digital Publishing USA, A Viacom Company, Red Hat Software, Inc., ISBN 1-57595-199-1B, pp. 1-385.

*User Manual For AddressMate and AddressMate Plus*, CoStar Corporation, AddressMate Software, 1994-1995, pp. 1-210.

*Getting Results With Microsoft® Office 97, Real World Solutions For The Work You Do*, Microsoft Corporation, pp. 1-703.

InfoCentral™ 7, User's Manual, Corel Corporation, vol. 1, Version 7.0, 1996, pp. 1-86.

Corel® Office Professional 7 Quick Results User's Manual, vol. 1, Version 7.0 (first printing), Corel Corporation, Limited, pp. 1-531.

Novell GroupWise User's Guide for Windows 16-Bit Version 5.2, Novell, Inc., 1993-1997, pp. 1-231.

Novell GroupWise User's Guide for Windows 32-Bit Version 5.2, Novell, Inc., 1998, pp. 1-318.

Claris Em@iler Getting Started User's Guide, For Macintosh, Claris Corporation, 1995-1997.

Developer's Guide To Apple Data Detectors, For Version 1.0.2., Apple Computer, Inc., 1997, pp. 1-33.

Apple Data Detectors User's Manual, Apple Computer, Inc., 1997, pp. 1-15.

Nardi, Bonnie A.; Miller, James R.; Wright, David J., "Collaborative, Programmable Intelligent Agents," Jim Miller/Miramontes Computing, Apple Computer Advanced Technology Group, Mar. 1998, pp. 1-11.

C.A.S. Santos, L.F.G. Soares, G.L. de Souza, and J.P. Courtiat, Design Methodology and Formal Validation of Hypermedia Documents, *Proceedings of the Sixth ACM International Conference on Multimedia*, (1998), p. 39-48.

Loren Terveen, Will Hill, and Brian Amento, Constructing, Organizing, and Visualizing Collections of Topically Related Web Resources, *ACM Transactions on Computer-Human Interaction*, vol. 6, No. 1, (Mar. 1999), p. 67-94.

Rob Barrett, Paul P. Maglio, and Daniel C. Kellem, How To Personalize the Web, *Conference Proceedings on Human Factors in Computing Systems*, (1997), p. 75-82.

Matthew Marx and Chris Schmandt, CLUES: Dynamic Personalized Message Filtering, *Proceedings of the ACM 1996 Conference on Computer Supported Cooperative Work*, (1996), p. 113-121.

Karl M. Goschka and Jurgen Falb, Dynamic Hyperlink Generation for Navigation in Relational Databases, *Proceedings of the Tenth ACM Conference on Hypertext and Hypermedia: Returning to Our Diverse Roots*, (1999), p. 23-24.

Alex Pentland, Perceptual User Interfaces: Perceptual Intelligence, *Commun. ACM*, 43, 3 (Mar. 2000), p. 35-44.

Mark A. Stairmand, Textual Context Analysis for Information Retrieval, *Proceedings of the 20th Annual International ACM SIGIR Conference on Research and Development in Information Retrieval*, (1997), p. 140-147.

Robert J. Glushko, Jay M. Tenebaum, and Bart Meltzer, An XML Framework for Agent-Based E-Commerce, *Commun. ACM* 42, 3 (Mar. 1999) p. 106.

Technique for Automatically Correcting Words in Text; Karen Kukich;*ACM Comput. Surv.*, 24, 4 (Dec. 1992); pp. 377-439.

Putting People First: Specifying Proper Names in Speech Interfaces, Matt Marx and Chris Schmandt; *Proceedings of the ACM Symposium on User Interface Software and Technology*; 1994; pp. 29-37.

Interface and execution models in the fluke kernel; Bryan Ford, Mike Hibler, Jay Lepreau, Roland McGrath and Patrick Tullman; *Proceedings of the third symposium on operating systems design and implementation*, (1999) p. 101-115.

Exploring the applications user-expertise assessment for intelligent interfaces; Michel C. Desmarais and Jiming Liu; *Proceedings of the conference on human factors in computing systems*, (1993) p. 308-313.

Future directions in user-computer interface software; James D. Foley; *Conference proceedings on organizational computer systems*, (1991) p. 289-297.

Human-computer interface development: concepts and systems for its management, H. Rex Hartson and Deborah Hix; *ACM Comput. Surv.* 1 (Mar. 1989) p. 5-92.

Integrating computer technology, people technology; strategies and case studies from Georgia Tech's Graphics, Visualization and Usability Center; Jim Foley; *Proceedings of the workshop on advanced visual interfaces*, (1994) p. 34-43.

Command management system for next-generation user input; M. Tsai, P. Reiher and G.J. Popek; *Proceedings of the seventh workshop on hottopics in operating systems*, (1999) p. 17984.

U.S. Appl. No. 09/818,157, filed Mar. 27, 2001, entitled "Automatically Adding Proper Names to a Database."

U.S. Appl. No. 09/841,265, filed Apr. 24, 2001, entitled "Method and System for Applying Input Mode Bias."

U.S. Appl. No. 09/841,266, filed Apr. 24, 2001, entitled "Method and System for Providing Electronic Commerce Actions Based on Semantically Labeled Strings."

U.S. Appl. No. 09/906,552, filed Jul. 16, 2001, entitled "Method and System for Providing Restricted Actions for Recognized Semantic Categories."

U.S. Appl. No. 09/906,467, filed Jul. 16, 2001, entitled "Application Program Interfaces for Semantically Labeling Strings and Providing Actions Based on Semantically Labeled Strings."

U.S. Appl. No. 09/907,418, filed Jul. 17, 2001, entitled "Method and System for Defining Semantic Categories and Actions."

U.S. Appl. No. 09/588,411, filed Jun. 6, 2000, entitled "Method and System for Semantically Labeling Strings and Providing Actions Based on Semantically Labeled Strings."

U.S. Appl. No. 10/141,712, filed May 9, 2002, entitled "Method, System, and Apparatus for Converting Dates Between Calendars and Languages Based Upon Semantically Labeled Strings."

U.S. Appl. No. 10/154,630, filed May 23, 2002, entitled "Method, System, and Apparatus for Converting Numbers Based Upon Semantically Labeled Strings."

U.S. Appl. No. 10/140,544, filed May 7, 2002, entitled "Method, System, and Apparatus for Converting Numbers Between Measurement Systems Based Upon Semantically Labeled String."

U.S. Appl. No. 10/179,810, filed Jun. 25, 2002, entitled "Method, System, and Apparatus for Performing Custom Actions on Digital Content."

U.S. Appl. No. 10/178,680, filed Jun. 24, 2002, entitled "System and Method for Incorporating Smart Tags in Online Content."

U.S. Appl. No. 10/179,438, filed Jun. 25, 2002, entitled "Method and System for Dynamically Providing Actions Associated with Semantically Labeled Strings."

U.S. Appl. No. 10/184,298, filed Jun. 27, 2002, entitled "Method and System for Associating Actions with Semantic Labels in Electronic Documents."

U.S. Final Official Action dated Nov. 15, 2005 cited in U.S. Appl. No. 09/841,265.

U.S. Official Action dated Nov. 22, 2005 cited in U.S. Appl. No. 10/141,712.

U.S. Appl. No. 10/164,960, filed Jun. 6, 2002, entitled "Providing Contextually Sensitive Actions and Help Content in Computer-Generated Documents".

U.S. Appl. No. 10/164,260, filed Jun. 5, 2002, entitled "Mechanism for Downloading Software Components from a Remote Source for Use by a Local Software Application".

U.S. Appl. No. 10/731,899, filed Dec. 9, 2003, entitled "Mechanism for Downloading Components Associated with XML Documents and Smart Documents".

U.S. Appl. No. 10/366,141, filed Feb. 13, 2003, entitled "Linking Elements of a Document of Corresponding Fields, Queries and/or Procedures in a Database".

U.S. Appl. No. 10/377,258, filed Feb. 28, 2003, entitled "Method and System for Enhancing Paste Functionality of a Computer Software Application".

U.S. Appl. No. 10/608,267, filed Jun. 27, 2003, entitled "Leveraging Markup Language Data for Semantically Labeling Text Strings and Data and for Providing Actions Based on Semantically Labeled Text Strings and Data".

U.S. Appl. No. 10/780,376, filed Feb. 17, 2004, entitled "Methods and Systems for Providing Automatic Actions on Recognized Text Strings in a Computer-Generated Document".
U.S. Appl. No. 10/184,190, filed Jun. 27, 2002, entitled "System and Method for Providing Namespace Related Information".
U.S. Official Action dated Apr. 8, 2005 cited in U.S. Appl. No. 10/164,960.
U.S. Official Action dated Apr. 19, 2005 cited in U.S. Appl. No. 09/841,266.
U.S. Official Action dated Jun. 6, 2005 in U.S. Appl. No. 10/164,260.
U.S. Official Action dated Sep. 2, 2005 cited in U.S. Appl. No. 10/366,141.
U.S. Official Action dated Oct. 20, 2005 cited in U.S. Appl. No. 09/906,552.
U.S. Official Action dated Nov. 2, 2005 cited in U.S. Appl. No. 10/184,190.
U.S. Official Action dated Nov. 10, 2005 cited in U.S. Appl. No. 10/164,260.
U.S. Official Action dated Dec. 14, 2005 cited in U.S. Appl. No. 10/608,267.
U.S. Official Action dated Jan. 11, 2006 in U.S. Appl. No. 09/841,266.
U.S. Official Action dated Jan. 17, 2006 in U.S. Appl. No. 10/140,544.
U.S. Official Action dated Feb. 2, 2006 in U.S. Appl. No. 09/906,467.
Menu Customizing, IBM Technical Disclosure Bulletin, vol. 34, No. 1, Jun. 1991, No. 91-92 (4 pp. total).
Perry, Brad, et al., "Discovering Similar Resources by Content Park-Linking", Proceedings of the Sixth International Conference on Information and Knowledge Management, published by ACM Press 1997, pp. 317-324.
Schulz, Charles, "Writing Applications for Uniform Operation on a Mainframe or PC: A Metric Conversion Program", Lockheed Missles & Space Company, Inc., Sunnyvale, CA, May 1990, pp. 348-361.
Devanbue, P. et al., "Chime: customizable hyperlink insertion and maintenance engine for software engineering environments", Software Engineering, Publication date: 1999, ISBN: 1-58113-07400.
"Using Flyswat", http://www.flywsat.com/using.html, download date: Sep. 28, 1999, 1 pp.
"What is Flyswat", http://www.flyswat.com, download date: Sep. 28, 1999, 5 pp.
"Intelligent Text Processing: About", http://www.syntalex.co.uk/about/about.html, download date: Aug. 7, 1999, 1 pp.
"Intelligent Text Processing: Automatic Cross-Referencing", http://www.syntalex.co.uk/services/acrl.html, download date Aug. 7, 1999, 3 pp.
"Intelligent Text Processing: Case Study: Context", http://www.syntalex.co.uk/casestudies/context.html, download date: Aug. 7, 1999, 3 pp.
"Integrating with External Systems: iPlanet™ Unified Development Server", Sun Microsystems, Inc., Ver. 5.0, Aug. 2001, pp. 127-156.
Sperberg-McQueen, C.M. and Thompson, Henry, "XML Schema", W3C Architecture Domain, http://web.archive.org/web/20020802155904/http://www.w3.org/XML/Schema, 2000-2002, pp. 1-10.
Quin, Liam, "Extensible Markup Language (XML)", W3C Architecture Domain, http://web.archive.org/web/2002121962057/http://www.w3.org/XML/, 1996-2002, pp. 1-3.
Clark, James, and DeRose, Steve, "XML Path Language (XPath), Version 1.0", W3C, http://web.archive.org/web/2021010034434/http://www.w3.org/TR/xpath, 1999-2000, pp. 1-31.
"Microsoft BizTalk Server 2002—Using BizTalk Mapper", http://msdn.Microsoft.com/library/en-us/bts_2002/htm/lat_xmltools_map_intro_zkqb.asp..., Microsoft Corporation, 1999-2001, pp. 1-2.
"BizTalk Server 2002 Mapper User Interface", http://msdn.microsoft.com/library/en-us/bts_2002/htm/lat_xmltools_map_concept_codw..., Microsoft Corporation, 1999-2001, pp. 1.
"BizTalk Server 2002 Compiling Maps", http://msdn.microsoft.com/library/en-us/bts_2002/html/lat_xmltools_map_concept_drgl.a..., Microsoft Corporation, 1999-2001, pp. 1.
"Biz Talk Server 2002 Testing Maps", http://msdn.microsoft.com/library/en-us/bts_2002/htm/lat_xmltools_map_concept_fhhy.a..., Microsoft Corporation, 1999-2001, pp. 1-2.
"BizTalk Server 2002 View Links and Functoids By Using Grid Preview", http://msdn.microsoft.com/library/en-us/bts_2002/htm/lat_xmltools_map_check_fuwn.as..., Microsoft Corporation, 1999-2001, pp. 1.
"The StarOffice™ 6.0 Suite: New Features Guide", Sun Microsystems, V. 1.1, Jul. 2002, pp. 1-31.
"New Microsoft Office Family Application Taps Power of Industry-Standard XML", http://www.microsoft.com/presspass/press/2002/oct02/10-09officefamilypr.mspx, Microsoft Corporation, Oct. 2002-Feb. 2003, pp. 1-2.
"Q&A: How 'XDocs' Alters the Paradigm for Gathering Business-Critical Information", http://www.microsoft.com/presspass/press/2002/oct02/10-09officefamily.mspx, Microsoft Corporation, Oct. 2002-Feb. 2003, pp. 1-4.
"InfoPath: Microsoft Names New Product from Office Group", http://www.microsoft.com/presspass/press/2003/feb03/02-10infopath.mspx, Microsoft Corporation, Oct. 2002-Feb. 2003, pp. 1-4.
"Microsoft Unveils Visual Studio.NET Enterprise Tools", Microsoft Corporation, http://microsoft.com/presspass/press/2001/may01/05-21vseepr.mspx, May 2001, pp. 1-4.
"Microsoft Extends XML Web Services Support in .NET Enterprise Servers Through Visual Studio .NET", http://www.microsoft.com/presspass/press/2002/feb02/02-13servervspr.mspx, Microsoft Corporation, Feb. 2002, pp. 1-3.
"How to Use XSL to Transform Excel XML Spreadsheet for Server-Side Use", http://support.microsoft.com/default.aspx?scid=kb;en-us;278976, Microsoft Corporation, Aug. 2004, pp. 1-7.
Mueller, Jennifer M., "Work Smarter with Smart Tags", Journal of Accounting—Online, vol. 194, No. 5, Nov. 2002, http://www.aicpa.org/pubs/jofa/nov2002/Mueller.htm>, retrieved on Apr. 22, 2005.
M. Fernandez et al., "SilkRoute: trading between relations and XML", Computer Networks, vol. 33, No. 1-6, Jun. 2000, pp. 723-745.
V. Braganholo, "Updating Relational Databases Through XML Views", Technical Report, Sep. 2002, pp. 1-61.
G. Falquet et al., "Design and Analysis of Active Hypertext Views on Databases", Information Sciences Institute, Jan. 2002, pp. 1-24.
S. Ceri et al., "Deriving Production Rules for Incremental View Maintenance", Proceedings of the 17th International Conference on Very Large Data Bases, Sep. 1991, pp. 577-589.
A. Bonifati, "Active Behaviors within XML Document Management", EDBT Ph. D. Workshop, Mar. 2000, pp. 1-4.
"Integrated Development Enviorment (IDE)", http://web.archive.org/web/20020602032242/http:altova.com/products_ide.html, Jun. 2002, pp. 1-2.
Arbortext, "Arbortext and Accessibility", http://web.archive.org/web/20021219133536/www.arbortext.com/html/accessibility.html, Dec. 2002, pp. 1-5.
Arbortext, "XML Compliance, 100% Pure XML", http:web.archive.org/web/20021209185855/www.arbortext.com/html/xml_compliance, Dec. 2002, pp. 1-3.
Arbortext, "Schemas", http://web.archive.org/web/20021221023148/www.arbortext.com/html/schemas.html, Dec. 2002, pp. 1-3.
Arbortext, "Arbortext's Support for XSL-FO", http://web.archive.org/web/20021221021632/www.arbortext.com/html/xsl-fo.html. Dec. 2002, pp. 1-4.
Corel, "Corel XMetal4, Making XML Content Creation Easy", http://web.archive.org/web/20031118215158/www.corel.com/servlet/Satellite?pagename, Nov. 2003, pp. 1-2.
Corel, "Corel XMetal 4 and Interwoven TeamXML", http://web.archive.org/web/20030807211225/www.corel.com/futuretense_cs/ccurl/corel+xml+4+and+interwoven+teamxml.pdf, Aug. 2003, pp. 1-2.
Corel, "The Corel-XyEnterprise XML Solution", http://web.archive.org/web/20030807154355/www.corel.com/futuretence_cs/ccurl/corel+and+XY+enterprise+XML+solution.pdf, Aug. 2003, pp. 1-2.
Brooks-Bilson, "Programming ColdFusion" [electronic resource] 2001, Safari Tech Books Online, 1st Edition, 25 pp.

Wilker, John, "ColdFusion MX Adds J2EE, XML, and Web Services Compatibility", Aug. 9, 2002, http://builder.com.com/5102-6387-104585.html, 3 pp.

Homer, Alex et al., Professional Active Services Pages, 1997, Wrox Press Ltd., Section"Client-Side Scripting and Components", subsection "Choosing Your Applets, and Controls", 16 pp.

Flanagan, D., "JavaScript—The Definitive Guide, Fourth Edition", Jan. 2002, O'Reilly, 12 pp.

Brockschmidt, K., "Inside OLE, Second Edition", 1995, Microsoft Press, p. 169.

Toth, V., "Visual C++ 4 Unleashed", 1996, Sams Publishing, p. 174.

Sriram, V., "ComponentXchange: An E-Exchange for Software Components", Master Thesis, CitSeer, May 2001, pp. i-v, 1-77.

Bosak, "XML: The Universal Publishing Format", SGML/XML Europe '98, May 1998, pp. A1-C17.

Kristensen, "Template Resolution in XML/HTML", Computer Networks and ISDN Systems, vol. 30, 1998, pp. 239-249.

Fan et al., "FormPlus: A Form Authoring Toolkit", Proceedings of the Fourteenth Annual Computer Software and Applications Conference, Oct. 31, 1990-Nov. 2, 1990, pp. 255-260.

Boone, "Concept Features in Re: Agent, An Intelligent Email Agent", Proceedings of the 2nd International Conference on Autonomous Agents, May 9-13, 1998, pp. 141-148.

Takkinen et al., "CAFÉ: A Conceptual Model for Managing Information in Electronic Mail", Proceedings of the Annual Hawaii International Conference On System Sciences, 1998, pp. 44-53.

"Altova markup your mindl!" http://web.archive.org/web/20021204211721/http://altova.com/products_ide.html, Dec. 2002, pp. 1-3.

"Smart Tags: Dumb Technology?", webreference.com, Online, Aug. 29, 2001, http://www.webreference.com/xml/column30/3.html, 3 pp.

"Being 'Smart' with Smart Tags in Office XP", Create for Mississippi, Aug. 2001, http://www.create.cett.msstate.edu/create/howto/smart_tags.pdf, 7 pp.

U.S. Official Action dated Dec. 29, 2003 in U.S. Appl. No. 09/588,411.

U.S. Official Action dated Feb. 12, 2004 in U.S. Appl. No. 10/154,630.

U.S. Official Action dated Mar. 29, 2004 in U.S. Appl. No. 09/906,552.

U.S. Official Action dated Jun. 14, 2004 in U.S. Appl. No. 09/588,411.

U.S. Official Action dated Jun. 18, 2004 in U.S. Appl. No. 09/818,157.

U.S. Official Action dated Jul. 15, 2004 in U.S. Appl. No. 09/906,467.

U.S. Official Action dated Aug. 20, 2004 in U.S. Appl. No. 09/841,266.

U.S. Official Action dated Sep. 29, 2004 in U.S. Appl. No. 09/907,418.

U.S. Official Action dated Oct. 6, 2004 in U.S. Appl. No. 09/818,157.

U.S. Official Action dated Nov. 2, 2005, in U.S. Appl. No. 10/184,190.

U.S. Official Action dated Jan. 25, 2005 in U.S. Appl. No. 09/906,552.

U.S. Official Action dated Jan. 26, 2005 in U.S. Appl. No. 10/154,630.

U.S. Official Action dated Mar. 1, 2005 in U.S. Appl. No. 09/818,157.

U.S. Official Action dated Mar. 24, 2005 in U.S. Appl. No. 10/141,712.

U.S. Official Action dated May 5, 2005 in U.S. Appl. No. 09/906,467.

U.S. Official Action dated May 6, 2005 in U.S. Appl. No. 09/907,418.

U.S. Official Action dated May 20, 2005 in U.S. Appl. No. 10/184,298.

U.S. Official Action dated Oct. 4, 2005 in U.S. Appl. No. 10/183,317.

U.S. Official Action dated Nov. 15, 2005 in U.S. Appl. No. 09/841,265.

U.S. Official Action dated Dec. 5, 2005 in U.S. Appl. No. 09/907,418.

U.S. Official Action dated Feb. 16, 2006 in U.S. Appl. No. 10/184,298.

Harold, E.R., "XML: Extensible Markup Language", IDG Books Worldwide, Books 24x7.com printout, 1998, 20 pp.

Marais, Hannes, "Supporting Cooperative and Personal Surfing With a Desktop Assistant", 1997, ACM Press, pp. 129-138.

U.S. Appl. No. 11/396,937, filed Apr. 3, 2006, entitled "Automatically Adding Proper Names to a Database".

U.S. Official Action dated Feb. 24, 2006 in U.S. Appl. No. 10/154,630.

U.S. Official Action dated Apr. 5, 2006 in U.S. Appl. No. 10/377,258.

U.S. Official Action dated Apr. 10, 2006 in U.S. Appl. No. 10/179,810.

U.S. Official Action dated Apr. 17, 2006 in U.S. Appl. No. 10/179,438.

U.S. Official Action dated Apr. 17, 2006 in U.S. Appl. No. 10/184,190.

U.S. Official Action dated May 26, 2006 in U.S. Appl. No. 09/588,411.

U.S. Official Action dated May 31, 2006 in U.S. Appl. No. 10/141,712.

U.S. Official Action dated Jun. 1, 2006 in U.S. Appl. No. 10/366,141.

U.S. Final Official Action dated Jul. 19, 2006 in U.S. Appl. No. 09/906,552.

U.S. Official Action dated Aug. 2, 2006 in U.S. Appl. No. 10/731,899.

U.S. Official Action dated Aug. 9, 2006 cited in U.S. Appl. No. 10/164,960.

U.S. Final Official Action dated Aug. 18, 2006 cited in U.S. Appl. No. 09/907,418.

U.S. Official Action dated Sep. 28, 2006 cited in U.S. Appl. No. 10/608,267.

U.S. Final Official Action dated Oct. 5, 2006 cited in U.S. Appl. No. 09/841,266.

U.S. Official Action dated Oct. 6, 2006 cited in U.S. Appl. No. 10/140,544.

U.S. Official Action dated Oct. 10, 2006 cited in U.S. Appl. No. 09/841,265.

European Communication dated Apr. 19, 2006 in EP 05 000 506.5-1527.

U.S. Final Office Action dated Oct. 19, 2006 cited in U.S. Appl. No. 09/906,467.

European Communication dated Sep. 25, 2006 in EP 03 01 4181.

World Wide Web Consortium, "Document Object Model (DOM) Level 2 Events Specification, Version 1.0", http://www.w3.org/TR/2000/REC-DOM-Level-2-Events-20001113/DOM2-Events.pdf, Nov. 2000, 50 pp.

World Wide Web Consortium, "Document Object Model (DOM) Level 2 Core Specification, Version 1.0", http://www.w3.org/TR/2000/REC-DOM-Level-2-Core-20001113/DOM2-Core.pdf, Nov. 2000, 107 pp.

European Communication dated Nov. 9, 2006 in EP 03010292.5.

"Word 2002 Add in: measurement Converter Smart Tag", http://www.microsoft.com/downloads/details.aspx?FamilyID=f67fc42c-5f41-4c3f-9d5a-71354471dc32&DisplayLang=en, retrieved on Nov. 9, 2006, 2 pgs.

"Microsoft Measurement Converter Smart Tag—Chinese Version", http://www.jiyang.gov/cn/laiying/My%20Pictures/%E8%B4%E5%BA%86%E8%BE%89/office2003/FILES/PFILES/COMMON/MSSHARED/SMARTTAG/CMEASURE/1033/CHMCABT.HTM, retrieved on Nov. 7, 2006, 2 pgs.

U.S. Office Action dated Nov. 9, 2006 cited in U.S. Appl. No. 10/184,298.

U.S. Office Action dated Nov. 15, 2006 cited in U.S. Appl. No. 10/179,438.

U.S. Official Action dated Dec. 20, 2006 in U.S. Appl. No. 10/154,630.

U.S. Final Official Action dated Dec. 26, 2006 in U.S. Appl. No. 10/179,810.

U.S. Official Action dated Jan. 5, 2007 in U.S. Appl. No. 10/183,717.

U.S. Official Action dated Jan. 11, 2007 in U.S. Appl. No. 10/184,190.

U.S. Official Action dated Jan. 25, 2007 in U.S. Appl. No. 10/608,267.

European Communication dated Nov. 17, 2006 in EP 03 011 851.7-2211.

European Communication dated Dec. 11, 2006 in EP 03 012 830.0-2211.

Singapore Search Report/Written Opinion dated Jan. 26, 2007 in SG 200500214-2.
U.S. Official Action dated Feb. 6, 2007 cited in U.S. Appl. No. 09/588,411.
U.S. Official Action dated Feb. 7, 2007 cited in U.S. Appl. No. 10/179,438.
U.S. Official Action dated Feb. 21, 2007 cited in U.S. Appl. No. 10/366,141.
European Communication dated Feb. 16, 2007 cited in European Application No. 04 003 683.2-2211.
Anonymous, "Adding Data from Other Sources in PowerPoint 2002," Jul. 2002, Internet article, XP-002420700, A Professional Approach Series the E-Zine Approach, http://www.glencoe.com/ps/computered/pas/article.php4?articleId-437, 8 pgs.
Rice, F.C., "Transform XML Files with XSLT When Importing into Microsoft Excel 2002," Jul. 2001, Internet article, XP-002420701, http://msdn2.microsoft.com/en-us/library/aa140055(office.10. d=printer).aspx, 9 pgs.
Johnson, L., "What's So Special About Paste Special?", Jun. 2002, Internet article, XP-002420702, http://pubs.logicalexpressions.com/Pub0009/LPMArticle.asp?ID=40, 5 pgs.
Anonymous, "Moving and Copying Text Tutorial," Aug. 17, 2001, Internet Article, XP-002307566, http://tutorials.findtutorials.com/read/category/102/id/342/p/3, 4 pgs.
U.S. Official Action dated Mar. 9, 2007 cited in U.S. Appl. No. 10/426,446.
U.S. Official Action dated Mar. 12, 2007 cited in U.S. Appl. No. 10/141,712.
U.S. Official Action dated Apr. 10, 2007 cited in U.S. Appl. No. 09/907,418.
U.S. Official Action dated May 14, 2007 cited in U.S. Appl. No. 09/906,552.
U.S. Official Action dated May 30, 2007 cited in U.S. Appl. No. 09/906,457.
U.S. Final Official Action dated Jun. 15, 2007 cited in U.S. Appl. No. 10/731,899.
Blaheta et al., "Assigning Function Tags to Parsed Text," Morgan Kaufmann Publishers Inc., 2000, pp. 234-240.
U.S. Official Action dated Jun. 28, 2007 cited in U.S. Appl. No. 09/841,266.
U.S. Final Office Action dated Jul. 12, 2007 cited in U.S. Appl. No. 10/184,298.
U.S. Office Action dated Jul. 12, 2007 cited in U.S. Appl. No. 10/154,630.
U.S. Office Action dated Jul. 20, 2007 cited in U.S. Appl. No. 09/841,263.
U.S. Final Office Action dated Jul. 26, 2007 cited in U.S. Appl. No. 10/164,960.
U.S. Office Action dated Aug. 10, 2007 cited in U.S. Appl. No. 10/179,810.
U.S. Office Action dated Sep. 10, 2007 cited in U.S. Appl. No. 10/179,438.
U.S. Appl. No. 11/924,856, filed Oct. 26, 2007 entitled "Providing Contextually Sensitive Tools and Help Content in Computer-Generated Documents".
U.S. Office Action dated Oct. 9, 2007 cited in U.S. Appl. No. 10/183,317.
U.S. Final Office Action dated Oct. 16, 2007 cited in U.S. Appl. No. 09/907,418.
U.S. Final Office Action dated Oct. 19, 2007 cited in U.S. Appl. No. 10/184,190.
U.S. Final Office Action dated Oct. 19, 2007 cited in U.S. Appl. No. 09/588,411.
U.S. Final Office Action dated Oct. 19, 2007 cited in U.S. Appl. No. 10/141,712.
U.S. Final Office Action dated Oct. 30, 2007 cited in U.S. Appl. No. 09/906,552.
European Communication dated Sep. 25, 2007 cited in European Application No. 03 014 181.6-1243.
Japanese Official Action dated Oct. 19, 2007 cited in Japanese Application No. 2003-128417.
U.S. Final Office Action dated Dec. 7, 2007 cited in U.S. Appl. No. 10/426,446.

Russian Official Action dated Oct. 11, 2008 cited in Russian Application No. 2003118722.
Pershikov, V.I., "Explanatory Dictionary in Informatics," Finances and Statistics, Moscow, 1991 (in Russian with translated sections) 5 pgs.
U.S. Final Office Action dated Dec. 18, 2007 cited in U.S. Appl. No. 10/366,141.
Malaysian Search Report dated Aug. 2, 2007 cited in Malaysian Application No. PI 20040265.
U.S. Office Action dated Sep. 27, 2007 cited in U.S. Appl. No. 10/608,267.
U.S. Final Office Action dated Dec. 26, 2007 cited in U.S. Appl. No. 09/841,265.
U.S. Office Action dated Dec. 26, 2007 cited in U.S. Appl. No. 10/377,258.
U.S. Final Office Action dated Jan. 7, 2008 cited in U.S. Appl. No. 10/179,438.
U.S. Final Office Action dated Jan. 9, 2008 cited in U.S. Appl. No. 09/906,467.
David D. Lewis et al., "A Sequential Algorithm for Training Text Classifiers," Spring-Verlag New York, Inc., 1994, pp. 1-10.
U.S. Office Action dated Jan. 25, 2008 cited in U.S. Appl. No. 10/608,267.
U.S. Office Action dated Feb. 8, 2008 cited in U.S. Appl. No. 10/141,712.
U.S. Office Action dated Feb. 15, 2008 cited in U.S. Appl. No. 10/731,899.
U.S. Final Office Action dated Feb. 20, 2008 cited in U.S. Appl. No. 10/154,630.
Singapore Examination Reported (conducted by Austrian Patent Office) dated Jan. 25, 2008 cited in SG Application No. 200500214-2.
Chinese Official Action dated Dec. 28, 2007 cited in Application No. 200410005390.8.
Chinese Official Action dated Jan. 4, 2008 cited in Application No. 200510009487.0.
Wei Ying-bin et al., "A New Technology ColdFusion of Realizing Dynamic Webpage," 2000, 6 pgs. (English language translation, pp. 1-6).
European Examination Report dated Mar. 4, 2006 cited in EP Application No. 02 014 717.9-1527.
European Examination Report dated Mar. 4, 2006 cited in EP Application No. 03 012 432.5-1527.
U.S. Official Action dated Oct. 5, 2005 cited in U.S. Appl. No. 10/179,810.
Microsoft Computer Dictionary, Fifth Edition, Microsoft Press, p. 409, 2002.
U.S. Appl. No. 10/426,446, filed Apr. 49, 2003, entitled "Methods and System For Recognizing Names In A Computer-Generated Document and For Providing Helpful Actions Associated With Recognized Names."
Russian Official Action dated Jan. 11, 2008 cited in Russian Application No. 2004105880/09(006292).
V. Doroth et al., "Modern Computer Vocabulary," St. Petersburg, BHV-Peterburg, 2001, p. 465 (with English language translation).
U.S. Official Action mailed Apr. 1, 2008 cited in U.S. Appl. No. 09/907,418.
U.S. Official Action mailed Apr. 29, 2008 cited in U.S. Appl. No. 09/588,411.
U.S. Final Official Action mailed Apr. 29, 2008 cited in U.S. Appl. No. 10/179,810.
U.S. Official Action mailed May 1, 2008 cited in U.S. Appl. No. 10/183,317.
European Communication Summons to Attend Oral Proceedings dated Mar. 4, 2008 in EP 05 000 506.5-1527.
European Communication Summons to Attend Oral Proceedings dated Mar. 10, 2008 in EP 03 01 0292.5-1527.
European Preliminary Opinion dated August 27, 2008 cited in European Application No. 04002224.6-1527/1447754.
Rubin, C., "Microsoft Word 2000 Official Manual", First Edition, Nikkei BP Soft Press, Inc., Aug. 2, 1999, pp. 215-217.
U.S. Office Action dated May 27, 2008 cited in U.S. Appl. No. 09/906,552.

U.S. Examiner's Answer BPAI dated Jun. 5, 2008 cited in U.S. Appl. No. 10/184,298.

U.S. Office Action dated Jun. 11, 2008 cited in U.S. Appl. No. 09/841,265.

U.S. Office Action dated Jun. 12, 2008 cited in U.S. Appl. No. 10/426,446.

U.S. Office Action dated Jun. 13, 2008 cited in U.S. Appl. No. 10/780,376.

U.S. Final Office Action dated Jun. 27, 2008 cited in U.S. Appl. No. 10/377,258.

M. Stowe, "XML in Excel and the Spreadsheet Component", Microsoft Corporation, Aug. 2001, 6 pgs.

C. Heinemann, "Cross-Reference your XML Data", Microsoft Corporation, Dec. 7, 1998, 6 pgs.

D. Obasanjo, "XML_Namespaces and How They Affect Xpath and XSLT", Microsoft Corporation, May 20, 2002, 19 pgs.

European Communication Summons to Attend Oral Proceedings dated May 7, 2008 cited in European Application No. 04002224.6.

Russian Official Action dated Mar. 13, 2008 cited in Russian Application No. 2004104096/09(004398).

Japanese Official Action dated Mar. 28, 2008 cited in Japanese Application No. 2003-178497.

Pixley, "Document Object Model (DOM) Level 2 Events Specification Version 1.0", World Wide Web Consortium, Nov. 13, 2000, www.w3.org/TR/2000/REC-DOM-Level-2-Events-20001113/DOM2-Events.pdf.

European Communication dated Jun. 3, 2008 cited in European Application No. 03 011 851.7-2211.

Japanese Official Action dated Apr. 18, 2008 cited in Japanese Application No. 2003-128417.

Polish Official Letter dated Jun. 24, 2008 cited Polish Application No. P 365553.

U.S. Final Office Action dated Jul. 29, 2008 cited in U.S. Appl. No. 10/141,712.

"XML Schema Part 2: Datatypes," W3C, May 2, 2001, http ://www.w3.org/TR/2001/REC-xmlschema-2-20010502/, pp. 1-146 (separated into 2 documents—A & B).

U.S. Office Action dated Aug. 1, 2008 cited in U.S. Appl. No. 10/366,141.

Ghamrawi et al., "Collective Multi-Label Classification," ACM, 2005, pp. 195-200.

Japanese Office Action dated Jul. 18, 2008 cited in Japanese Application No. 2002-207514.

"The Spatial Smart Tag", Geomatic Technologies, Mar. 10, 2005, 2 pp.

Harmon, D., "Microsoft MapPoint 2002", Geoworld Quick-Take Reviews, Aug. 2001, 3 pp.

Irie R. et al., "Resources for Place Name Analysis", May 28, 2004, 4 pp.

Rajabifard, A. et al., "Creating an Enabling Platform for the Delivery of Spatial Information", Spatial Sciences Institute Biennial Conference, Sep. 12, 2005, 10 pp.

Camarda, B., Special Editing Using® Microsoft® Office Word 2003, Que, Dec. 12, 2003, pp. 1-5.

Ivens, K., Office XP Smart Tags, Microsoft, Mar. 6, 2002, pp. 1-4.

Frye, C., Microsoft Office Systems: Step by Step, Microsoft Press, 2003 Edition, Sep. 3, 2003, pp. 1-6.

U.S. Official Action mailed Sep. 8, 2006 in U.S. Appl. No. 10/948,948.

U.S. Official Action mailed Feb. 15, 2007 in U.S. Appl. No. 10/948,948.

U.S. Official Action mailed Oct. 18, 2007 in U.S. Appl. No. 10/948,948.

U.S. Official Action mailed Mar. 20, 2008 in U.S. Appl. No. 10/948,948.

U.S. Official Action mailed Oct. 16, 2008 in U.S. Appl. No. 10/948,948.

U.S. Official Action mailed Oct. 16, 2008 in U.S. Appl. No. 10/154,630.

European Search Report dated Dec. 12, 2006 in European Application No. 05 105 000.3-1527.

European Examination Report dated Oct. 9, 2007 in European Application No. 05 105 000.3-1527.

Chinese Official Action dated Dec. 7, 2007 in Chinese Application No. 200510088529.4.

Polish Official Action dated Aug. 27, 2008 in Polish Application No. P360520.

European Communication Minutes of Oral Proceedings and Decision dated Sep. 15, 2008 in European Application No. 05 000 506.5-1527.

Polish Second Official Action dated Oct. 28, 2008 in Polish Application No. P36553.

Japanese Office Action dated Oct. 10, 2008 cited in Application No. 2004-037158.

Chinese Office Action dated Oct. 17, 2008 cited in Application No. 03145242.6.

U.S. Final Office Action dated Dec. 8, 2008 cited in U.S. Appl. No. 10/183,317.

Australian First Official Action dated Oct. 21, 2008 cited in Application No. 2003204800.

U.S. Final Office Action dated Dec. 24, 2008 cited in U.S. Appl. No. 09/841,265.

Sharon Oviatt et al., "Integration and Synchronization of Input Modes during Multimodal Human-Computer Interaction," CHI 97, Atlanta, Georgia, Mar. 22-27, 1997, pp. 415-422.

U.S. Office Action dated Dec. 23, 2008 cited in U.S. Appl. No. 10/179,810.

U.S. Office Action dated Jan. 5, 2009 cited in U.S. Appl. No. 10/141,712.

European Statement regarding Grounds of Appeal dated Jan. 13, 2009 cited in Application No. 04 002 224.6.

"Adding Data from Other Source in Power Point 2002," Internet Article, The McGraw-Hill Companies, Inc., http://web.archive.org/web/20021221085214/ http://www.glencoe.com/ps/computered/pas/article.php4?articleID=437.

U.S. Final Office Action dated Jan. 22, 2009 cited in U.S. Appl. No. 10/366,141.

U.S. Office Action dated Feb. 4, 2009 cited in U.S. Appl. No. 10/377,258.

U.S. Final Office Action dated Mar. 4, 2009 cited in U.S. Appl. No. 10/780,376.

European Summons to Attend Oral Proceedings dated Feb. 26, 2009 cited in European Application No. 0301283.0-2211.

European Communication dated Mar. 18, 2009 cited in European Application No. 04003683.2-2211.

European Summons to Attend Oral Proceedings dated Mar. 20, 2009 cited in European Application No. 03012830.0.

Australian First Examiner's Report dated Sep. 15, 2008 cited in Australian Application No. 2003204379.

Japanese Final Official Action dated Nov. 25, 2008 cited in Japanese Application No. 2002-207514.

Japanese Official Action dated Feb. 6, 2009 cited in Japanese Application No. 2003-180218.

Japanese Official Action dated Feb. 13, 2009 cited in Japanese Application No. 2003-162911.

Japanese Official Action dated Feb. 24, 2009 cited in Japanese Application No. 2003-161338.

Japanese Official Action dated Mar. 6, 2009 cited in Japanese Application No. 2004-042140.

(Previously cited) Koyaku, H., "What is Brought to SQL Server 2000 by XML, Part 1: Function of XML Provided by SQL Server 2000", Enterprise Servers World, vol. 3, No. 12, IDG Japan, Inc., Dec. 1, 2000, pp. 42-53 (with English language translation).

Mexican Official Action dated Feb. 11, 2009 cited in Application No. PA/a/2003/005451.

Chinese Final Rejection dated Mar. 13, 2009 cited in Application No. 03145242.6.

Japanese Final Rejection dated Mar. 17, 2090 cited in Application No. 2004-037158.

Japanese Final Rejection dated Apr. 3, 2009 cited in Application No. 2002-207514.

U.S. Office Action dated Apr. 20, 2009 cited in U.S. Appl. No. 10/426,446.

U.S. Office Action dated Apr. 27, 2009 cited in U.S. Appl. No. 10/154,630.

Japanese Official Action dated May 26, 2009 cited in Application No. 2005-039754.

Chinese Decision on Rejection dated Jul. 3, 2009 cited in Application No. 03143003.01.

European Summons to Attend Oral Proceedings dated Aug. 5, 2009 cited in Application No. 03003931.7.

Polish Official Notice dated Aug. 25, 2009 cited in Application No. P.365553/DP.

Australian Official Action dated Sep. 11, 2009 cited in Application No. 2003204478.

Norwegian Official Action dated Aug. 24, 2009 cited in Application No. 2003 2550.

Polish Official Notice dated Sep. 22, 2009 cited in Application No. P. 364854/DP.

Polish Official Notice dated Sep. 23, 2009 cited in Application No. P. 360520/DP.

Korean Official Action dated Sep. 30, 2009 cited in Application No. 10-2003-40988.

Japanese Official Notice of Final Rejection dated Oct. 2, 2009 cited in Application No. 2003-162911.

U.S. Office Action dated Oct. 22, 2009 cited in U.S. Appl. No. 10/377,258.

Japanese Official Notice of Final Rejection dated Oct. 27, 2009 cited in Application No. 2003-161338.

Russian Official Action dated Jun. 21, 2009 cited in Application No. 2005104223/09(005505).

D. Richter, "Windows for professionals" (Win32 API programming for Windows NT 3.5 and Windows 95, translation from English, Moscow: Russian Edition, 1995, ISBN 5-7502-0010-8, pp. 26, 31, 215.

U.S. Final Office Action dated Nov. 30, 2009 cited in U.S. Appl. No. 10/179,810.

Glover et al., "Inferring hierarchical Descriptions," ACM, 2002, pp. 507-514, Nov. 4-9, 2002.

Malaysian Examination Report dated Nov. 30, 2009 cited in Application No. PI 20040559.

Australian Third Official Action dated Dec. 23, 2009 cited in Application No. 2003204478.

Australian First Official Action Report dated Jan. 18, 2009 cited in Application No. 2004200459.

* cited by examiner

| 10000 | 10 000 | 10.000 | 10,000 | 10.000.- |
|---|---|---|---|---|
| 10,000.-- | 10.000,20 | 10.000,- | 10 000,- | 10 000,- |
| 10 000,-- | 10000,20 | 10000$20* | 10.000$20* | 10000$20* |

| Austrian shilling | x öS, x ATS, ATS x, x Österreichische Schilling, öS x, x öS, öS x, OeS x, x OeS |
| Belgian franc | x BF, x FB, x BEF, 1 franc, x BF, x FB, BEF x |
| Deutschmark | x DM, x DEM, x Deutsche Mark, DM x, x D-Mark, DEM x |
| Dutch guilder | fl x, NLG x, x gulden, f x, ƒ x, x NLG |
| Euro | x €, x EUR, EUR x, € x, x Euro(s), x euroa, x e, e x, €x |
| Finnish markka | x mk, FIM x, x markkaa, x FIM |
| French franc | x F, x FRF, x Franc(s), x FF, x f, x ff |
| Greek drachma | x Δρχ, x GRD, GRD x, x Δραχμές x Δρχ., x δραχμές, x Δραχμή, x δρχ., x δραχμών, x Δραχμών, x δραχμής, x Δραχμής x ΔPX. |
| Irish pound | £x, IEP x, IR£x, IR£ x, x IEP |
| Italian lire | L x, ITL x, Lit x, x ITL |
| Luxembourg franc | x F, x LUF |
| Portuguese escudo | x Esc., x PTE, x escudos, 1000$00, 1.000$00, x ESC, PTE x |
| Spanish peseta | x pta, x PTA, x pta., x pts., x pt., x Pta., x Pts., x Pt., x pts, x pt, x Pta, x Pts, x Pt, x ESP, ESP x |

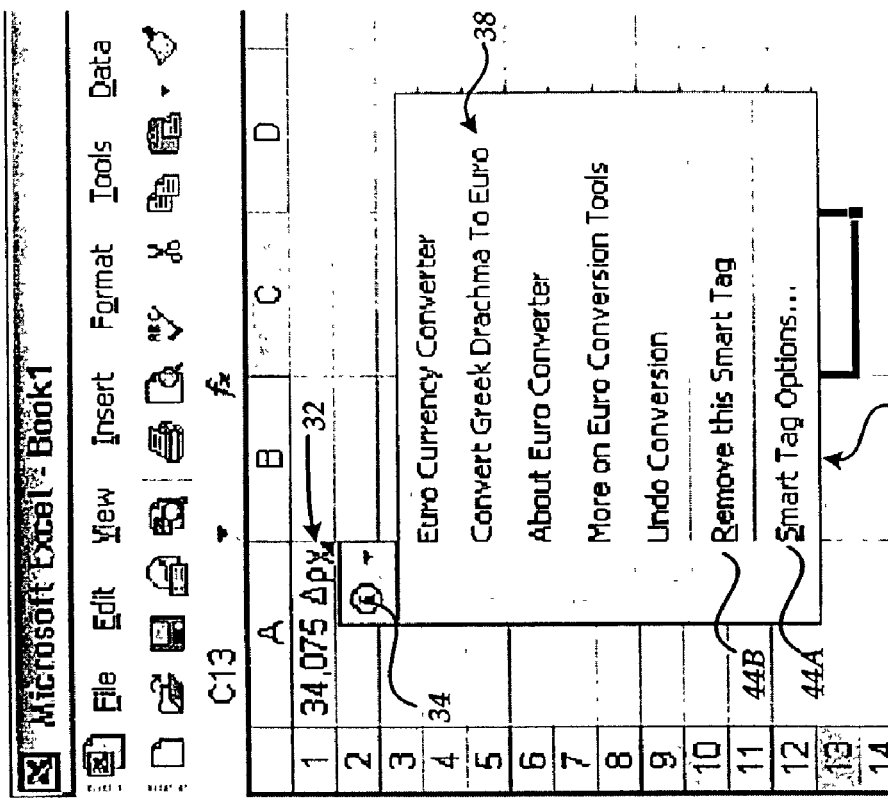
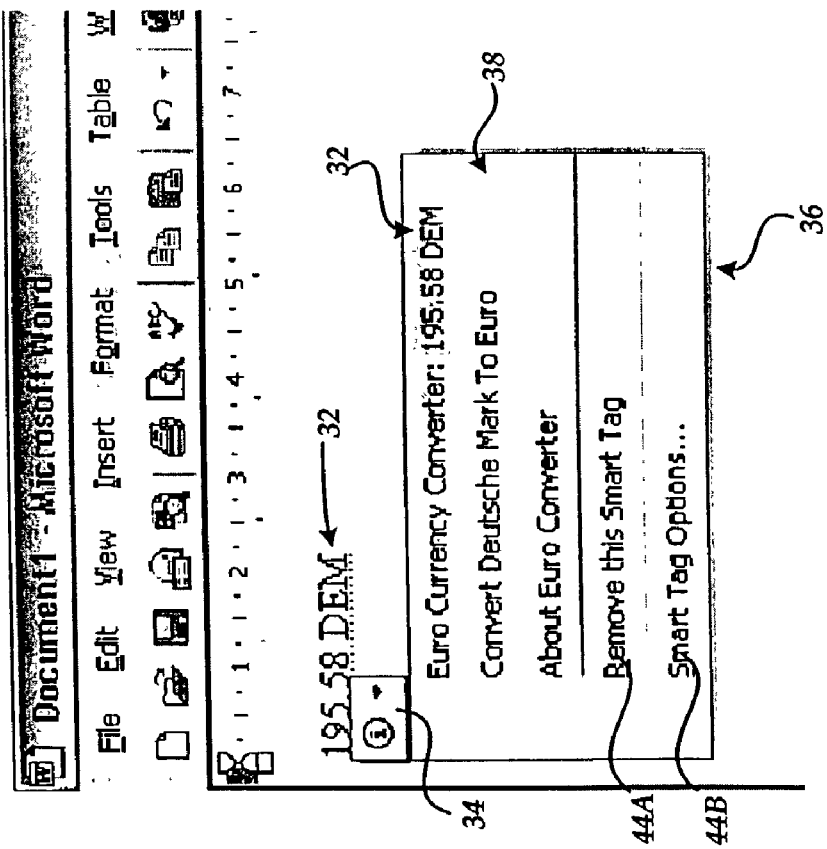
Fig.3D.
Fig.3A.

METHOD, SYSTEM, AND APPARATUS FOR CONVERTING CURRENCY VALUES BASED UPON SEMANTICALLY LABELED STRINGS

TECHNICAL FIELD

Embodiments of the present invention relate to the field of currency conversion. More particularly, embodiments of the invention relate to the field of converting currency values based upon semantically labeled strings.

BACKGROUND OF THE INVENTION

On Jan. 2, 2002, the new European currency, the Euro, became the official currency of twelve European countries. The countries that adopted the Euro as their official currency are Austria, Belgium, Finland, France, Germany, Greece, Ireland, Italy, Luxembourg, The Netherlands, Portugal, and Spain. After Feb. 28, 2002, the national currencies of these countries were no longer accepted for transactions. With the adoption of the Euro as the official currency of most European nations, a unified economic marketplace of over 300 million people has been created. Denmark, Great Britain, and Sweden may also adopt the Euro as their official currencies sometime in the future, thereby creating an even larger unified economic marketplace.

Although the conversion from national currencies to the Euro officially occurred in 2002, many electronic documents created prior to the conversion still contain references to the former national currencies of the member countries. Therefore, when these types of documents are utilized, it may be necessary to convert referenced currency values from the expressed national currency to the Euro. For instance, a user may need to easily and quickly convert a currency value referenced in a word processing document from French Francs to Euro. A user may also need to convert a Euro currency value to one of the former national currencies. However, converting currency values between national currencies and the Euro, and vice versa, has heretofore been difficult for a user to accomplish easily and quickly.

Previously, if a user wanted to convert a currency value referenced in an electronic document, such as a word processing document, between a national European currency and Euro, or vice versa, the user would first have to copy the currency value to be converted to a clipboard. The user would then paste the value into an external program or Web site capable of converting the currency value to Euro. Once the external program or Web site had completed the conversion, the user would copy the converted currency value to the clipboard and then paste the converted value back into the electronic document. The user might also have to locate the currency symbol for the converted type of currency and insert the symbol into the document.

Although systems such as these do allow a user to convert currency values between national European currencies and Euro, these systems can be difficult to use because of the large number of steps required to complete the conversion. Moreover, these previous solutions require the user to perform the conversion using the user interface language of the conversion program or Web site. This can be extremely frustrating for an international user that does not understand the language of the conversion program or Web site.

Therefore, in light of the above, there is a need for a method, system, and apparatus for easily converting currency values between Euro and the national currencies of the member European countries that do not require the user to utilize an external application or Web site to convert currency values. Moreover, there is a need for a method, system, and apparatus for converting currency values between Euro and the national currencies of the member European countries that can present conversion options to the user in a user-selected user interface language.

SUMMARY OF THE INVENTION

Embodiments of the present invention solve the above-described problems by providing a method, system, and apparatus for easily converting currency values between different currency types that do not require the use of an external application or Web site to convert the currency values. Moreover, embodiments of the present invention provide a method, system, and apparatus for converting currency values between different currency types that can present conversion options to the user in a user-selected interface language.

According to one actual embodiment of the present invention, a method is provided for converting currency values that is utilized in a system for creating and editing an electronic document. According to this embodiment of the invention, software modules are executed in conjunction with a software application for creating and editing an electronic document that allow the convenient conversion of currency values to different currency types. When a user types a string of text, such as a paragraph into the software application, the string is analyzed to determine whether the string of text includes a currency value. For instance, a user may type the value "10 F", which represents ten French Francs. If the string of text includes a currency value, the value is semantically labeled with schema information that identifies the type of currency. For instance, if a string of text includes the currency value "10 F", schema information will be associated with the currency value indicating that the currency value is expressed in Francs.

Once a currency value has been identified within a string of text, such as a paragraph, the application may display an indication to the user that the currency value has been semantically labeled. This indication also identifies to the user that actions may be performed on the currency value. When a selection is received of the currency value or the indication, a list of actions may be provided to the user identifying conversion options available for the currency value. For instance, if the identified currency value includes a reference to the currency type "F", for Francs, an action menu item may be displayed to the user for converting the currency value to Euro. Similarly, if the identified currency value is expressed in Euro, an action menu will be presented to the user for converting the value to one of the national European currencies. Other types of conversion options may also be presented to the user for converting the currency value.

According to one embodiment of the invention, a current user interface language setting for the application program is determined prior to providing the list of actions to the user. When the user selects the list of actions, the available actions are displayed to the user in a language specified by the current user interface language setting. In this manner, the user is always presented the conversion options in the current user interface language.

After the list of actions has been displayed to the user, a selection of one of the actions may be received. In response to receiving the selection of a conversion action, a converted currency value may be generated by converting the selected currency value to the destination currency type identified by the selected action. Once the conversion is completed, the converted currency value may be inserted into the string of text to replace the selected currency value. According to various embodiments of the present invention, a document object model supported by the application program may be utilized to insert the converted currency value into the string of text. Alternatively, the converted currency value may be displayed to the user.

According to another embodiment of the present invention, a system is provided for converting a currency value between currency types. The system provided according to this embodiment of the invention, includes a recognizer plug-in capable of receiving a portion of an electronic document as a string of text from an application program. For instance, the recognizer plug-in may receive a paragraph of text from an application program as it is typed by the user. Once the recognizer plug-in has received the string of text, the recognizer plug-in analyzes the string of text to determine whether the string of text includes a currency value. If the string, of text includes a currency value, the recognizer plug-in semantically labels the currency value with schema information identifying the type of currency used to express the currency value. This information is then passed by the recognizer plug-in back to the application program.

The system provided herein according to the various embodiments of the invention may also include an application program for creating, editing, or viewing an electronic document. For instance, the application program may comprise a word processor, a spreadsheet application program, an e-mail application which includes editing functions, a web browser application, or other types of application programs for creating, editing, and viewing electronic documents. According to this embodiment of the invention, the application program is capable of displaying the string of text along with an indication that the currency value has been semantically labeled by the recognizer plug-in. This indication may comprise a user interface object for indicating to a user that the currency value has been semantically labeled and that conversion actions may be performed on the currency value.

The application program may also be operative to receive a selection of the currency value or the indication and to provide a list of actions that may be performed on the currency value to convert the currency value to another currency type. The application may then receive the selection of one of the list of actions and provide the identity of the selection and the currency value to an action plug-in.

The system may also include an action plug-in that is capable of generating a converted currency value by converting the selected currency value to a destination currency type identified by action selected from the list of actions. The action plug-in is also operative to replace the selected currency value with the converted currency value in the destination type of currency. According to one actual embodiment of the invention, the action plug-in may replace the currency value with the converted currency value in the string of text by accessing a document object model provided by the application program. Alternatively, the converted currency value may be displayed to the user in a dialog box or window.

According to various embodiments of the present invention, the system provided herein may also include an action plug-in that is operative to register with the application program prior to performing any conversion functions. As a part of the registration procedure, the action plug-in may provide the list of actions that may be performed on the currency value to convert the currency value to another currency type. Moreover, when creating the list of actions, the action plug-in may determine a current user interface language setting for the application program and generate the action menu items in a language specified by the current user interface language setting.

Other embodiments of the present invention provide a computer-controlled apparatus and a computer-readable medium for converting currency values between currency types. These and other details regarding the various embodiments of the invention will become more apparent from the detailed description that follows.

BRIEF DESCRIPTION OF THE DRAWINGS

FIG. 1B is a block diagram showing the format and contents of a currency formats file utilized in various embodiments of the present invention to assist in the recognition of currency values expressed in many formats;

FIG. 1C is a block diagram showing the format and contents of a currency notations file utilized in various embodiments of the present invention to assist in the recognition of currency values expressed using many different notations;

FIGS. 3A-3F are screen diagrams showing screen displays including an action menu for converting currency values between currency types provided by various embodiments of the present invention;

DETAILED DESCRIPTION OF AN ILLUSTRATIVE EMBODIMENT

As described briefly above, embodiments of the present invention provide a method, system, apparatus, and computer-readable medium for converting currency values between currency types. In the following detailed description, references are made to the accompanying drawings that form a part hereof, and in which are shown by way of illustration specific embodiments or examples. These embodiments may be combined, other embodiments may be utilized, and structural changes may be made without departing from the spirit and scope of the present invention. The following detailed description is, therefore, not be taken in a limiting sense, and the scope of the present invention is defined by the appended claims and their equivalents.

Figure 1A:
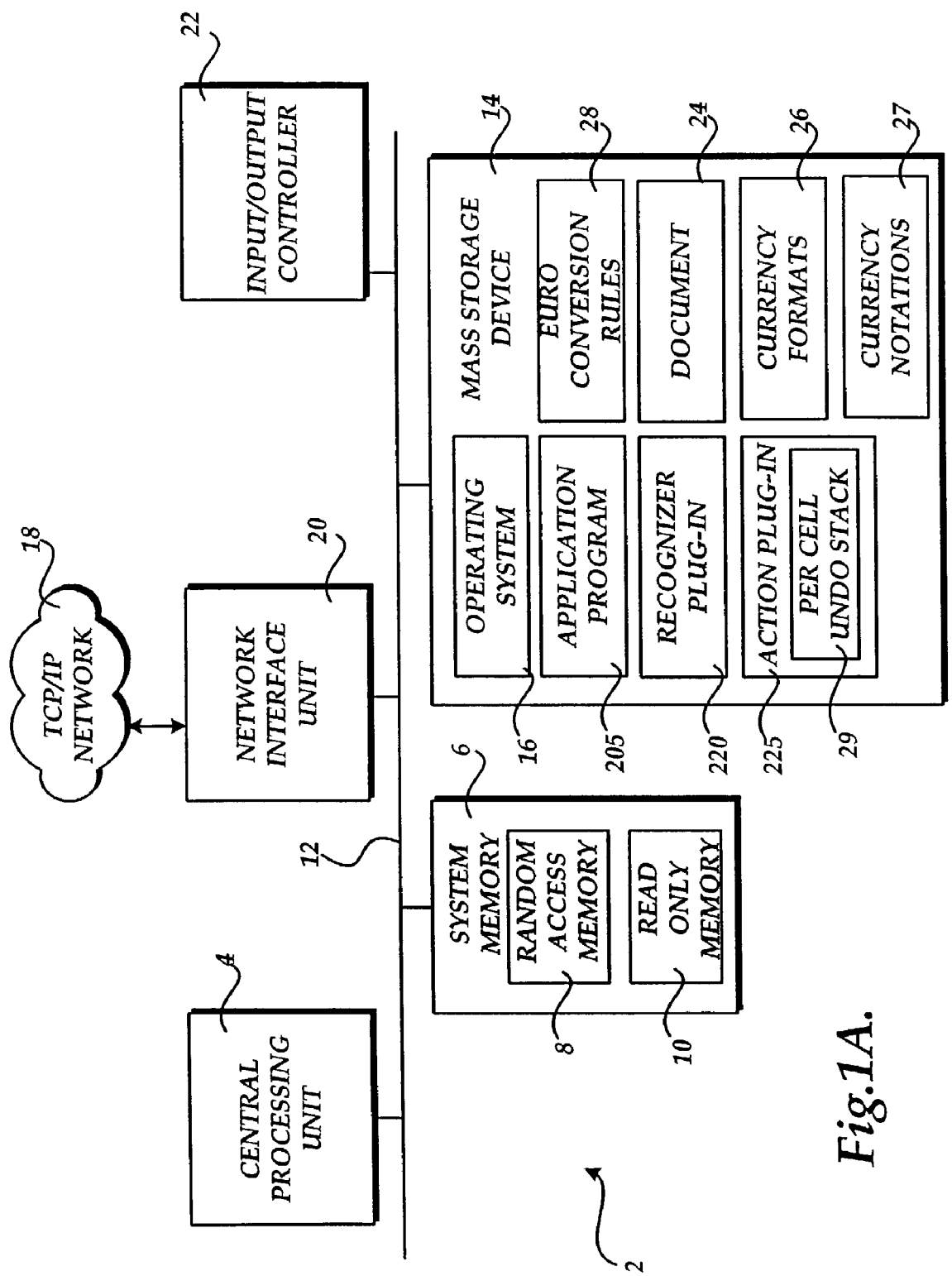
FIG. 1A is a block diagram showing the architecture of a personal computer that provides an illustrative operating environment for embodiments of the present invention.

Referring now to the drawings, in which like numerals represent like elements through the several figures, aspects of the present invention and the illustrative operating environment will be described. FIG. 1A and the following discussion are intended to provide a brief, general description of a suitable computing environment in which the invention may be implemented. While the invention will be described in the general context of program modules that execute in conjunction with an application program that runs on an operating system on a personal computer, those skilled in the art will recognize that the invention may also be implemented in combination with other program modules. Additional aspects of an illustrative operating environment and software architecture for implementing the various embodiments of the present invention are described in U.S. patent application Ser. No. 09/588,411, entitled "Method and System for Semantically Labeling Strings and Providing Actions Based on Semantically Labeled Strings", which is expressly incorporated herein by reference.

Generally, program modules include routines, programs, components, data structures, and other types of structures that perform particular tasks or implement particular abstract data types. Moreover, those skilled in the art will appreciate that the invention may be practiced with other computer system configurations, including handheld devices, multiprocessor systems, microprocessor-based or programmable consumer electronics, minicomputers, mainframe computers, and the like. The invention may also be practiced in distributed computing environments where tasks are performed by remote processing devices that are linked through a communications network. In a distributed computing environment, program modules may be located in both local and remote memory storage devices.

Turning now to FIG. 1A, an illustrative computer architecture for a personal computer 2 for practicing the various embodiments of the invention will be described. The computer architecture shown in FIG. 1A illustrates a conventional personal computer, including a central processing unit 4 ("CPU"), a system memory 6, including a random access memory 8 ("RAM") and a read-only memory ("ROM") 10, and a system bus 12 that couples the memory to the CPU 4. A basic input/output system containing the basic routines that help to transfer information between elements within the computer, such as during startup, is stored in the ROM 10. The personal computer 2 further includes a mass storage device 14 for storing an operating system 16, application programs, such as the application program 205, and data.

The mass storage device 14 is connected to the CPU 4 through a mass storage controller (not shown) connected to the bus 12. The mass storage device 14 and its associated computer-readable media provide non-volatile storage for the personal computer 2. Although the description of computer-readable media contained herein refers to a mass storage device, such as a hard disk or CD-ROM drive, it should be appreciated by those skilled in the art that computer-readable media can be any available media that can be accessed by the personal computer 2.

By way of example, and not limitation, computer-readable media may comprise computer storage media and communication media. Computer storage media includes volatile and non-volatile, removable and non-removable media implemented in any method or technology for storage of information such as computer-readable instructions, data structures, program modules or other data. Computer storage media includes, but is not limited to, RAM, ROM, EPROM, EEPROM, flash memory or other solid state memory technology, CD-ROM, DVD, or other optical storage, magnetic cassettes, magnetic tape, magnetic disk storage or other magnetic storage devices, or any other medium which can be used to store the desired information and which can be accessed by the computer.

According to various embodiments of the invention, the personal computer 2 may operate in a networked environment using logical connections to remote computers through a TCP/IP network 18, such as the Internet. The personal computer 2 may connect to the TCP/IP network 18 through a network interface unit 20 connected to the bus 12. It should be appreciated that the network interface unit 20 may also be utilized to connect to other types of networks and remote computer systems. The personal computer 2 may also include an input/output controller 22 for receiving and processing input from a number of devices, including a keyboard or mouse (not shown). Similarly, an input/output controller 22 may provide output to a display screen, a printer, or other type of output device.

As mentioned briefly above, a number of program modules and data files may be stored in the mass storage device 14 and RAM 8 of the personal computer 2, including an operating system 16 suitable for controlling the operation of a networked personal computer, such as the WINDOWS XP operating system from MICROSOFT CORPORATION of Redmond, Wash. The mass storage device 14 and RAM 8 may also store one or more application programs. In particular, the mass storage device 14 and RAM 8 may store an application program 205 for creating, editing, or viewing an electronic document 24. For instance, the application program 205 may comprise a word processing application program and the electronic document 24 may comprise a word processing document. The application program 205 may also comprise a spreadsheet application program and the electronic document 24 comprise a spreadsheet. Similarly, the application program 205 may comprise an electronic mail application program and the electronic document 24 may comprise an electronic mail message. Likewise, the application program 205 may comprise a web browser application program and the electronic document 24 may comprise a web page stored locally on the personal computer 2 or remotely on the network 18. Application programs for creating, editing, or viewing other types of electronic documents may also be used with the various embodiments of the present invention.

Embodiments of the present invention provide program modules for use in conjunction with the application program 205 that convert currency values contained within the electronic document 24 between currency types. In particular, embodiments of the invention provide a recognizer plug-in 220 and an action plug-in 225. As will be described in greater detail below, the recognizer plug-in 220 recognizes currency values contained within a portion of the electronic document 24 and labels the currency values with semantic information identifying their type of currency. The recognizer plug-in 220 then passes this information to the application program 205 for use by the action plug-in 225. The action plug-in 225 performs actions on the recognized currency values for converting to other types of currencies.

According to one embodiment of the invention, the action plug-in 225 converts currencies between the Euro and the national currencies of the European Union ("EU") member countries. The fixed conversion ratios for converting between Euros and national currencies, rounding rules, and rules regarding the calculation precision utilized in the conversion process are stored in the Euro conversion rules file 28. These rules are defined by the European Community regulation No. 1103/97 and are well known to those skilled in the art. As known to those skilled in the art, EC Regulation Nos. Z866/98 and 1478/2000 define the conversion rates.

According to various embodiments of the present invention, the action plug-in 225 may also generate a list of conversion actions that may be performed on a given currency value. As a part of this process, the action plug-in 225 may query language settings of the application program 205 or operating system 16 to identify the current language settings for the user interface language. The list of actions may then be created in the current user interface language.

According to one embodiment of the invention wherein the application program 205 comprises a spreadsheet application program, the action plug-in 225 maintains a per cell undo stack 29. The per cell undo stack 29 comprises one or more data structures that maintain a list of recently performed currency conversions. Through the use of the per cell undo stack 29, the action plug-in 225 allows a user to "undo" currency conversions on a per cell basis, thereby returning the contents of the cell to its state prior to the conversion. As will be described in greater detail below, the action plug-in may present a menu item to the user for performing a per cell undo operation.

According to the various embodiments of the present invention, the RAM 8 and the mass storage device 14 may also store a currency formats file 26 and a currency notations file 27. The currency formats file 26 and the currency notations file 27 store the format and notations for representing currencies in a variety of different manners. The currency formats file 26 and the currency notations file 27 are utilized by the recognizer plug-in 220 to recognize a wide variety of currency types and formats. Additional details regarding the contents of the currency formats file 26 and the currency notations file 27 will be described in below with reference to FIGS. 1B and 1C, respectively.

Referring now to FIG. 1B, various aspects of the currency formats file 26 will be described. As discussed briefly above, the currency formats file 26 is utilized by the recognizer plug-in 220. In particular, the recognizer plug-in 220 utilizes the currency formats file 26 to recognize currencies expressed utilizing different decimal and thousands separator symbols. This is necessitated by the fact that many different countries utilize contradicting separator symbols. For example, in the United States, a comma is utilized as a grouping separator and a period is utilized as a decimal separator. However, in some European countries, a period is utilized as a grouping separator and a comma is used as a decimal separator. Therefore, if the number "1,000" is entered, the number would be interpreted as one-thousand in the United States and as one in Europe. In order to avoid this confusion, the currency formats file 26 describes each of the possible currency formats, or combinations of decimal and separator symbols, recognized by the recognizer plug-in 220.

Turning now to FIG. 1C, various aspects of the currency notations file 27 will be described. As discussed briefly above, the currency notations file 27 is utilized by the recognizer plug-in 220. In particular, the recognizer plug-in 220 utilizes the currency notations file 27 to identify currencies expressed using a variety of different notations. For instance, the currency value for ten Finnish Markka may be expressed using the following notations: 10 mk, FIM 10, 10 markkaa, or 10 FIM. In order to account for the variations in currency notation, the currency notations file 27 contains a sequence of possible notations and the countries to which the notations correspond. The recognizer plug-in 220 uses the sequence of notations to identify currency values expressed using the notations in strings of text, or within a spreadsheet cell. It should be appreciated that the currency formats identified in the currency formats file 26 and the notations identified in the currency notations file 27 are merely illustrative and that other formats and notations may be utilized.

Figure 2:
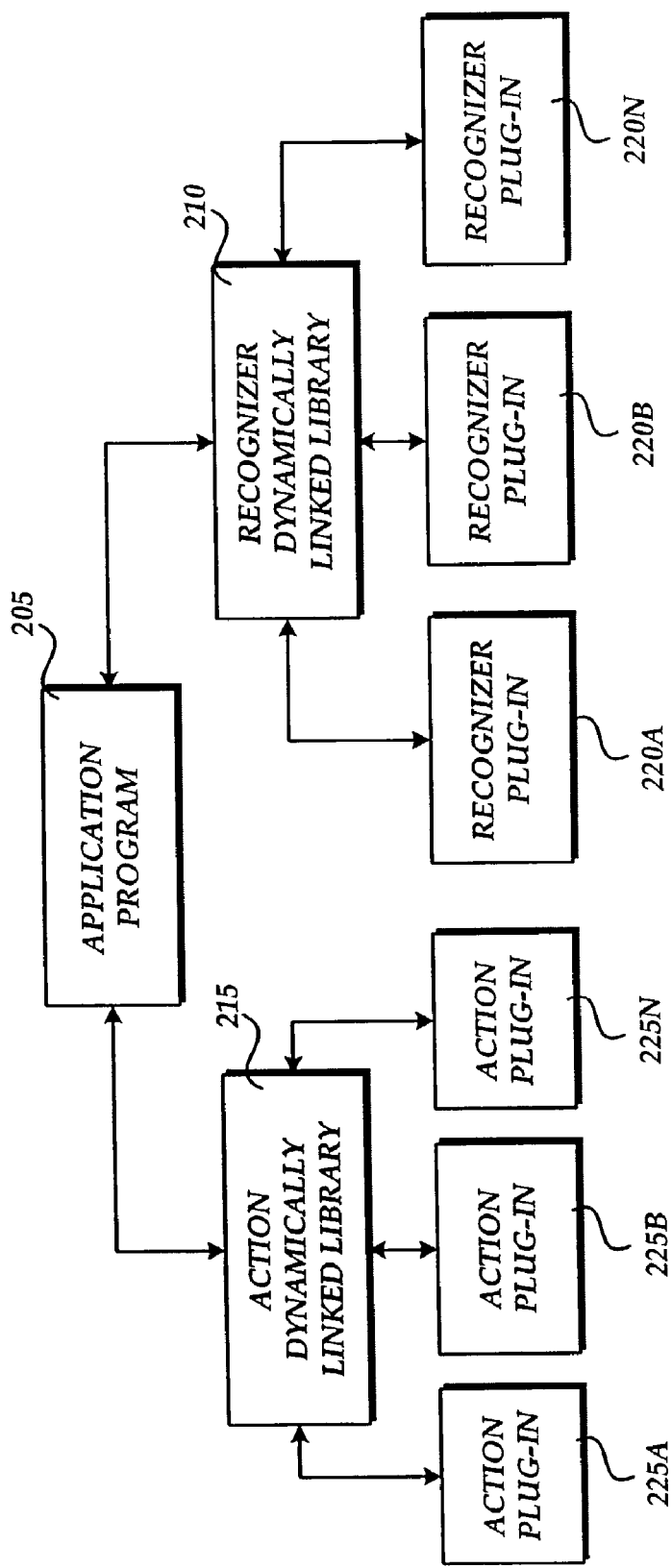
FIG. 2 is a block diagram that shows a software architecture for recognizing, labeling, and performing actions on recognized strings of text according to various embodiments of the present invention.

Referring now to FIG. 2, an illustrative software architecture for use in conjunction with the various embodiments of the present invention will be described. The architecture shown in FIG. 2 includes an application program 205, such as a word processor application program, a spreadsheet application program, web browser, or other type of application program for creating, editing, or viewing electronic documents. The application program 205 is able to communicate with a recognizer dynamically linked library ("DLL") 210 and an action DLL 215. As will be described in greater detail below, the recognizer DLL 210 controls one or more recognizer plug-ins 220A-220N and the action DLL 215 controls one or more action plug-ins 225A-225N.

According to one embodiment of the invention, the recognizer plug-ins 220A-220N and the action plug-ins 225A-225N are automation servers. Automation servers are well-known software components that are assembled into programs or add functionality to existing programs running on the WINDOWS XP operating system from MICROSOFT CORPORATION of Redmond, Wash. Automation servers may be written in a variety of computing languages and can be plugged and unplugged at runtime without having to recompile the host program.

The recognizer DLL 210 handles the distribution of text strings from an electronic document being edited by the application program 205 to the individual recognizer plug-ins 220A-220N. The recognizer plug-ins 220A-220N recognize particular strings in an electronic document, such as a word processing document or a spreadsheet document. The recognizer plug-ins 220A-220N may be packaged with the application program module 205 or they may be written by third parties to recognize particular strings of interest. Typically, the recognizer DLL 210 passes strings to the recognizer plug-ins 220A-220N in single paragraphs or cell value increments. However, strings may be passed to the recognizer plug-ins 220A-220N in other sizes and formats.

As part of recognizing certain strings as including semantic information, the recognizer plug-ins 220A-220N determine which strings are to be labeled and how they are to be labeled. After receiving these results from the various recognizer plug-ins 220, the recognizer DLL 210 sends semantic categories to the application program module 205. According to one actual embodiment of the invention, a recognizer plug-in 220 is provided for recognizing strings as containing currency values. According to this embodiment of the invention, the semantic category comprises schema information that identifies the currency type for the currency value. The schema information may also include information identifying the language in which the string of text is expressed. This information is returned to the recognizer DLL 210 by the recognizer plug-in 220 along with other information that may be utilized by a corresponding action plug-in 225, such as a copy of the currency value and the source currency type. Additionally, the recognizer plug-in 220 may return information identifying the location of the currency value within the text string, including the length of the text string and the character location of the first letter of the currency value.

It should be appreciated that each of the recognizer plug-ins 220A-220N are executed separately. The recognizer DLL 210 is responsible for handling the asynchronicity that results from different recognizer plug-ins 220A-220N returning results at different times. In this manner, various types of data may be recognized within a text string and different actions provided for each semantically labeled string. It should also be appreciated that more than one application program 205 may utilize the services of the recognizer DLL 210 and the action DLL 215 concurrently. Additional details regarding the operation of the recognizer plug-in 220 for recognizing currency values will be described below with reference to FIGS. 4-8.

After a string is labeled by a recognizer plug-in 220A-220N, schema information is sent to the application program module 205. A user of the application program module 205 may then execute actions that are associated with the schema information on the recognized string. The action DLL 215 manages the action plug-ins 225A-225N that are executed in order to perform the actions. As with the recognizer plug-ins 220A-22N, the action plug-ins 225A-225N may be packaged with the application program module 205 or written by third parties to perform particular actions that are of interest. The action plug-ins 225A-225N provide possible actions to be presented to the user based upon the schema information, or type label, associated with the string. As will be described in greater detail below, the list of actions provided to the user is dynamically generated for each schema type. This information is then provided to the application program 205 which displays the list of actions to the user when the string is selected.

After an action has been chosen from the list of actions, the action DLL 215 manages the appropriate action plug-in 225A-225N and passes the necessary information between the action plug-in and the application program module 205 so that the action plug-in may execute the desired action. Typically, the application program module 205 sends the action DLL 215 an automation request to invoke the action the user has selected. As will be described in greater detail below, according to one embodiment of the invention, an action plug-in 225 is provided that converts recognized currency values to other currency types. Additional details regarding the operation of the action plug-in 225 will be described in greater detail below with reference to FIGS. 3-8.

Figure 3B:
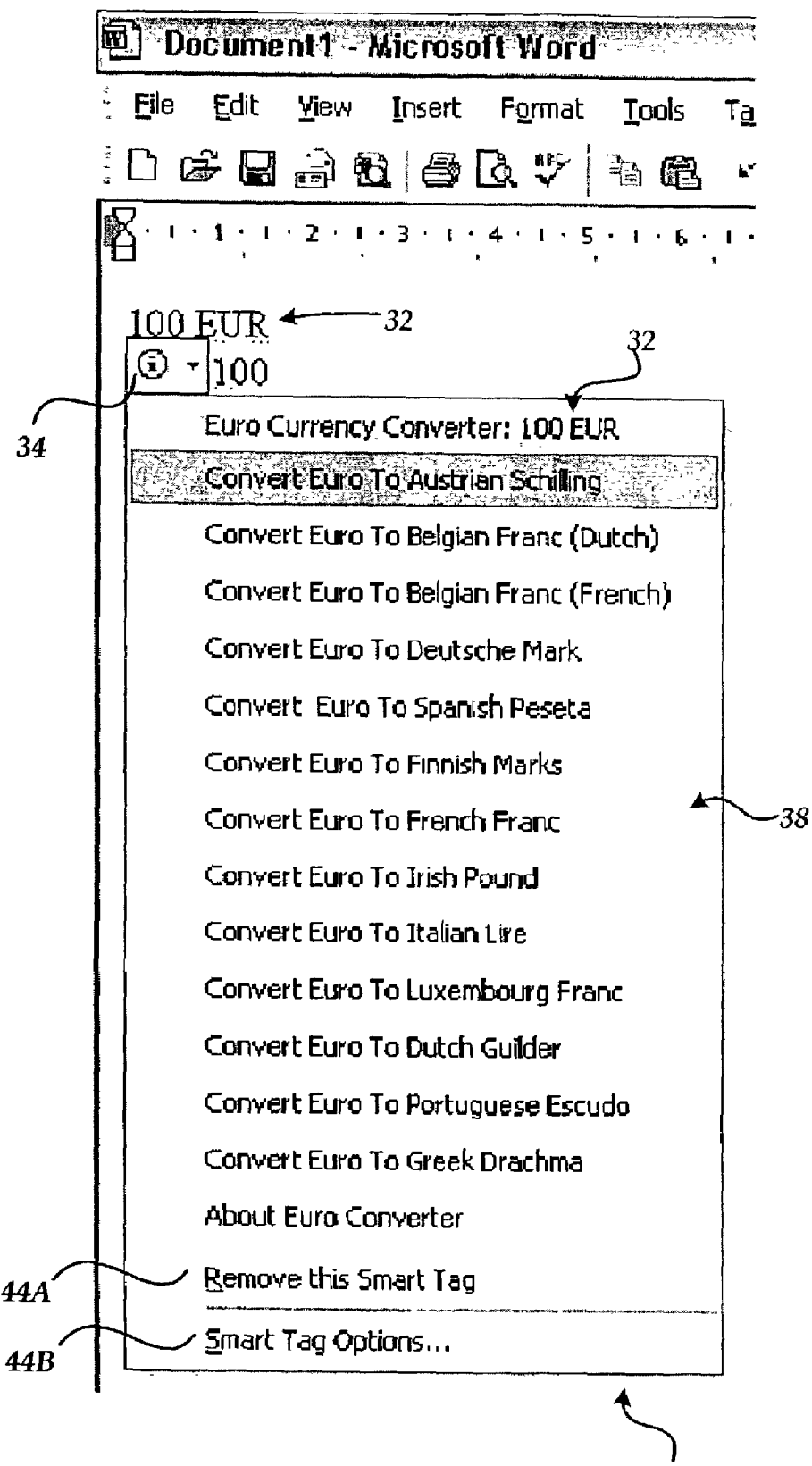

Referring now to FIGS. 3A-3D, an illustrative user interface provided by the various embodiments of the present invention will be described. FIGS. 3A and 3B illustrate a user interface provided by embodiments of the invention wherein the application program 205 comprises a word processing application program, such as WORD, from MICROSOFT CORPORATION of Redmond, Wash. As shown in FIG. 3A, a currency value 32 may be typed by a user into an application program 205, as a part of a string of text. Once the user has provided the string of text, the string of text is provided to a recognizer plug-in 220 that recognizes currency values contained within the string of text, such as the currency value 32. The currency value 32 identified by the recognizer plug-in 220 is identified to the application program module as a type of semantic information upon which actions may be performed. Therefore, the application program module 205 provides an indication to the user that actions may be performed on the currency value 32. This indication may be provided to the user by highlighting the currency value 32 or providing a user interface indication 34 in proximity to the currency value 32.

When the currency value 32 or the indication 34 is selected by a user, a list of actions is displayed that may be performed on the currency value to convert the currency value to another type of currency. This list of actions may comprise a dropdown menu 36 having one or more menu items corresponding to the list of actions that may be performed on the currency value 32. According to one embodiment of the invention, the contents of the dropdown menu 36 may be displayed in one of many different languages. The language in which the dropdown menu 36 is displayed is based on a current user interface language for the application program module 205 or the operating system 16. In this manner, international users throughout the world will be displayed a dropdown menu 36 in their currently installed and active user interface language. The list of actions 38, therefore, shown in FIGS. 3A-3F is displayed English. It should be appreciated, however, that the dropdown menu 36 would appear in another language if a language other than English was selected as the current user interface language on the personal computer 2.

As shown in FIG. 3A, the dropdown menu 36 includes an indication of the currency value 32 to be converted. The dropdown menu 36 also includes a list of actions 38 that may be performed to convert the currency value 32 to another type of currency. According to one embodiment of the invention, the list of actions 38 displayed in the dropdown menu 36 includes actions for converting the currency value 32 to Euro when the currency value is expressed in any other currency other than Euro. For instance, as shown in FIG. 3A, the selection of the recognized currency value 32 of "195.58 DEM" results in the display of a dropdown menu 36 including an action for converting Deutsche Mark to Euro. According to this embodiment of the invention, if the currency value 32 is expressed in Euro, the dropdown menu 36 includes actions for converting the currency value from Euro to other types of currencies. Therefore, as shown in FIG. 3B, if a user types the currency value 32 of "100 EUR", the dropdown menu 36 will include actions for converting from Euro to other currency types, such as Australian Schilling, Belgian Franc, Deutsche Mark, and others.

Once the selected conversion has been performed, the currency value 32 may be replaced in the string of text using a document object model provided by the application program 205. This process is described in greater detail below. Additionally, as will be discussed in greater detail below, the application program 205 receives most of the text shown in the dropdown menu 36 from the action plug-in 225. This process occurs when the application program 205 is initially executed and the action plug-in 225 registers itself with the application program 205. Additional details regarding this registration process will be described below with reference to FIG. 4.

As also shown in FIG. 3A, the application program module 205 also adds menu items 44A and 44B to the dropdown menu 36. The selection of item 44A removes the semantic information from a selected string of text and the selection of item 44B provides a list of user selectable preferences defining the operation and behavior of the recognizer and action plug-ins.

Figure 3C:
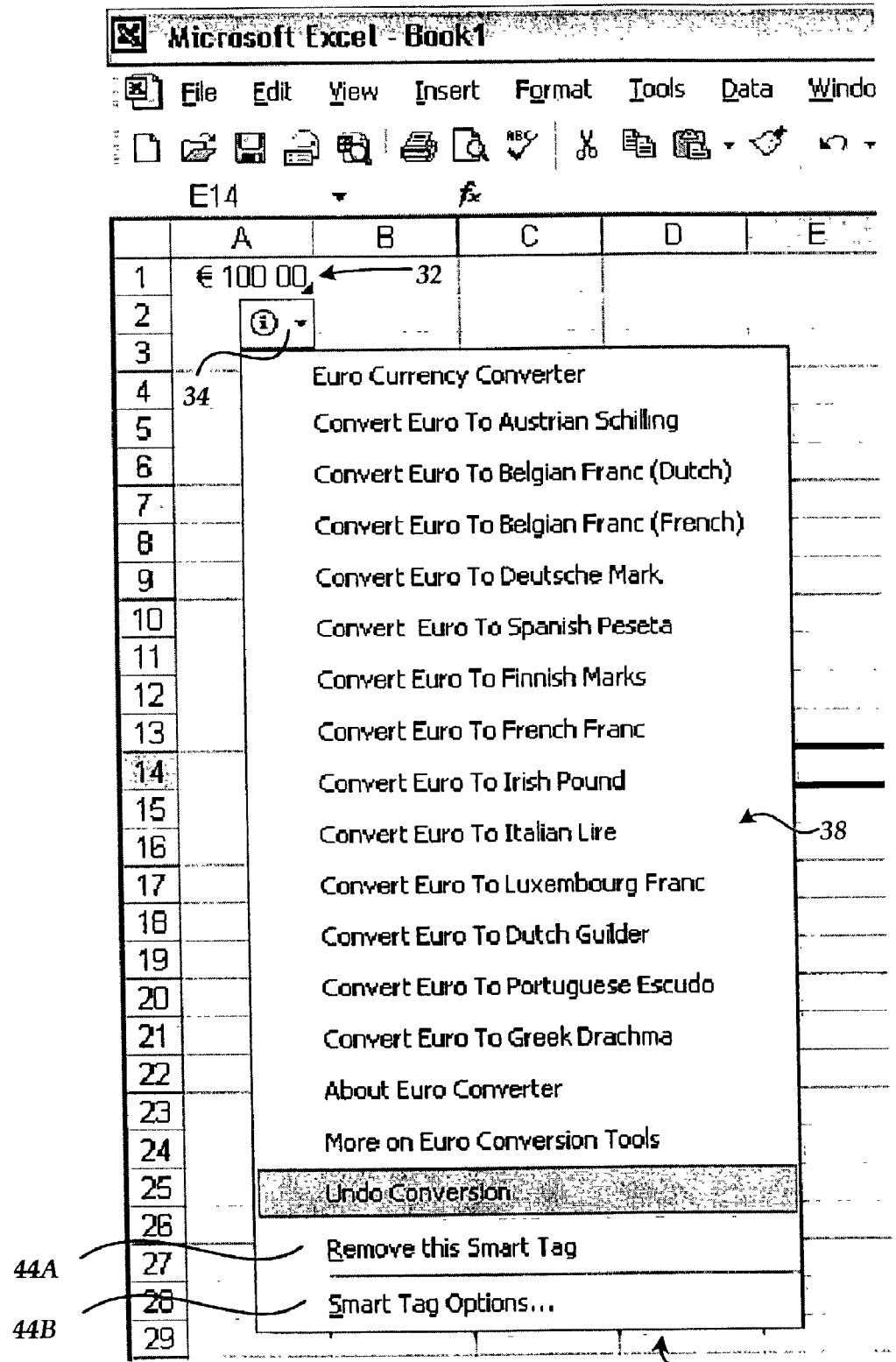

FIGS. 3C and 3D illustrate an embodiment of the invention wherein the application program 205 comprises a spreadsheet application program, such as EXCEL, from MICROSOFT CORPORATION of Redmond, Wash. When used in conjunction with a spreadsheet application program, the software components provided by the various embodiments of the invention operate in much the same way as with a word processing application program. However, when used in conjunction with a spreadsheet application program, numbers entered into cells are recognized as currency values. When the numbers are converted, they are inserted into a cell as numbers rather than text. Moreover, an accounting format associated with the destination type of currency may be applied to the cell.

As shown in FIG. 3C, if the entered currency value 32 is expressed in Euro, the dropdown menu 36 will include one or more actions for converting to one or more national currencies. As shown in FIG. 3D, if the entered currency value 32 is expressed in any currency other than Euro, the dropdown menu 36 includes one action for converting the currency value 32 to the Euro. Once the conversion operation has been performed, the converted currency value may be inserted into the appropriate cell, or the results of the conversion may be displayed to the user in a dialog box.

Figure 3F:
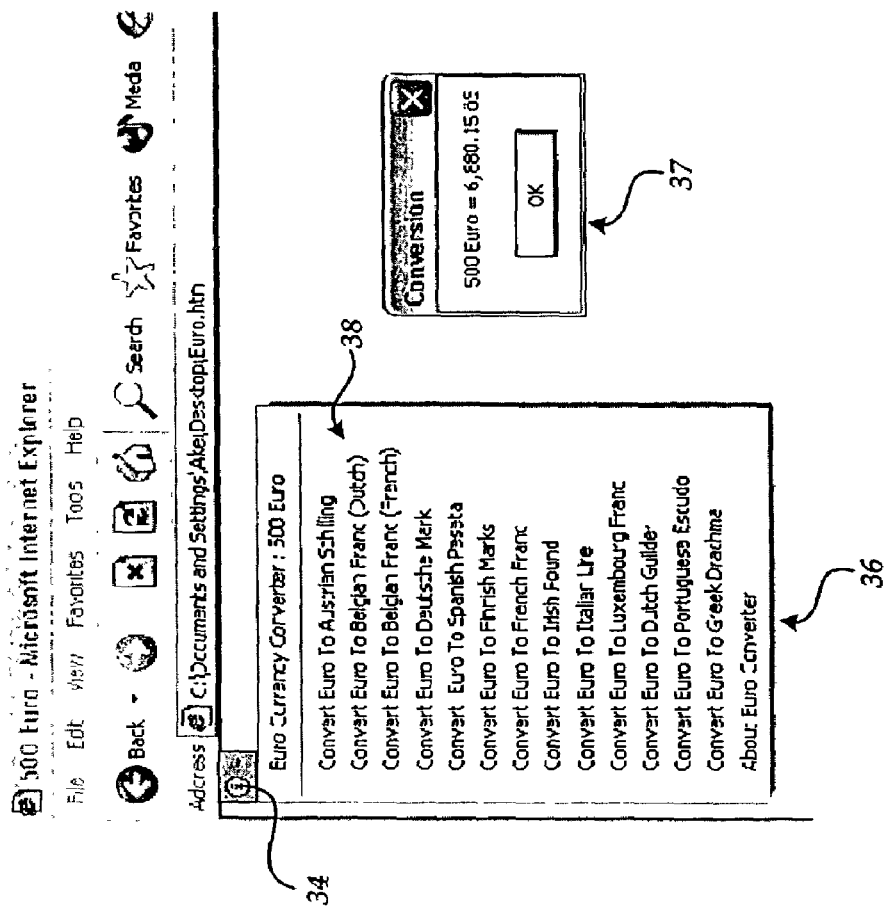
Figure 3E:
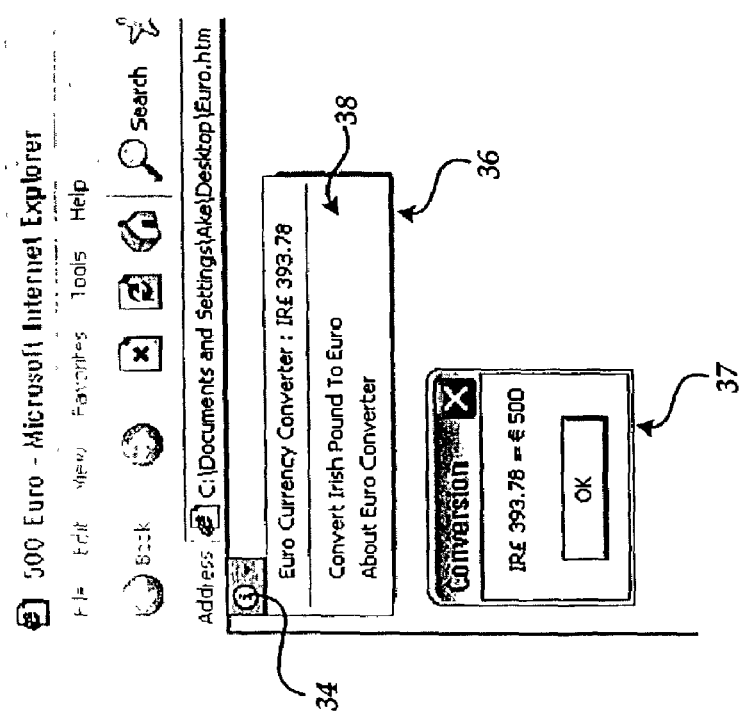

FIGS. 3E and 3F illustrate an embodiment of the invention wherein the application program 205 comprises a Web browser application program, such as INTERNET EXPLORER, from MICROSOFT CORPORATION of Redmond, Wash. As shown in FIGS. 3E and 3F, portions of a Web page displayed in the Web browser may be recognized as containing currency values. In response to the selection of one of the recognized currency values, a dropdown menu 36 may be displayed for converting the value to or from Euro. Once the user has selected an action from the list of actions 38, the conversion of the currency value 32 is performed according to the selected action. The converted currency value may then be displayed to the user in a dialog box 37 as shown in FIGS. 3E and 3F.

Figure 4:
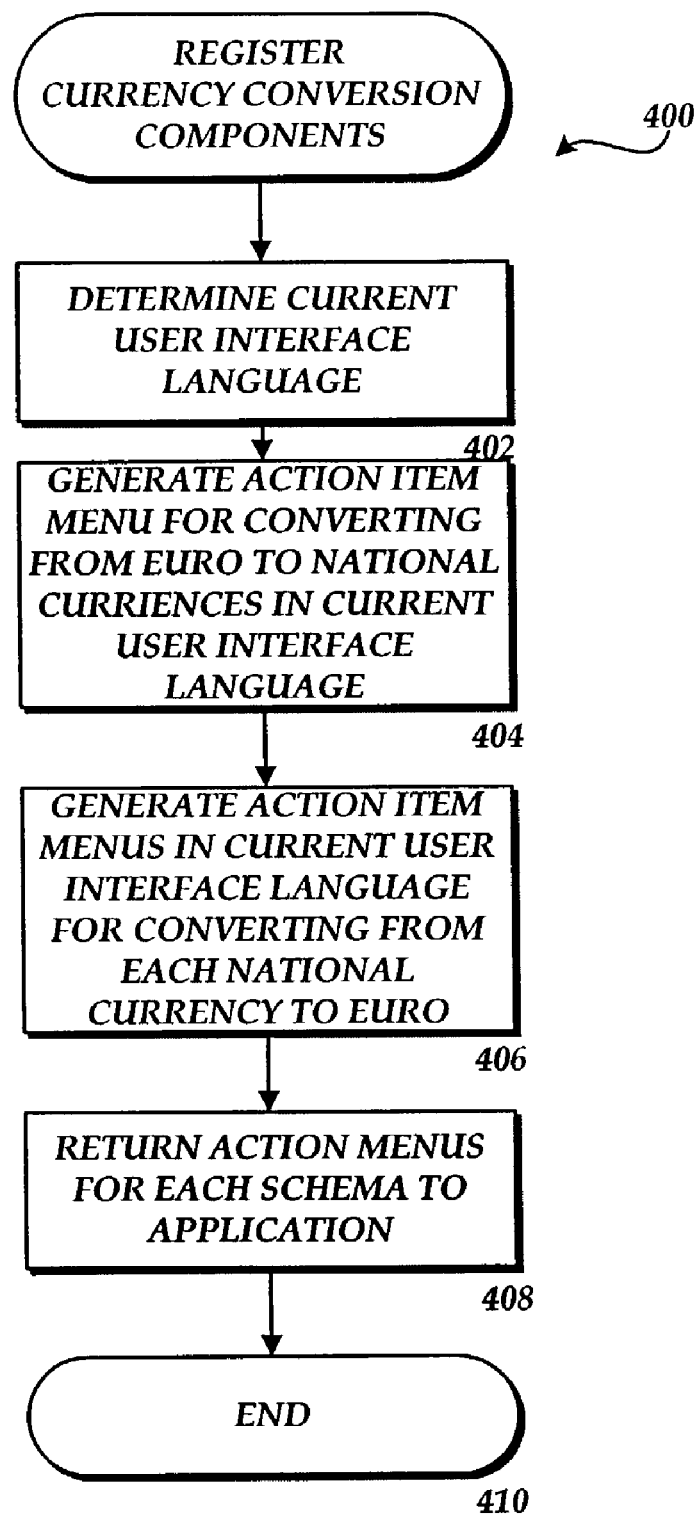
FIG. 4 is a flow diagram showing an illustrative routine for registering an action plug-in with an application program according to one actual embodiment of the present invention.

Referring now to FIG. 4, an illustrative routine 400 will be described for registering the currency conversion software components with the application program 205. In particular, when the action plug-in 225 and the recognizer plug-in 220 for converting currency values are first executed, they are registered with the application program 205. By registering with the application program 205, the application program 205 is made aware of the software components and enabled for use with the schema types recognized by the recognizer plug-in 220. Moreover, the action items to be displayed to the user corresponding to each schema type are also enumerated to the application program 205 so that the application program 205 can display the dropdown menu 36 when a currency value 32 or indicator 34 is selected by a user.

The routine 400 begins at block 402, where the current user interface language is identified. As discussed briefly above, the current user interface language may be stored in language settings maintained by the operating system 16 or the application program 205. Once the current user interface language has been identified, the routine 400 continues to block 404. At block 404, the action item menu for converting from Euro to national currencies is generated in the current user interface language. The routine 400 then continues from block 404 to block 406.

At block 406, separate action menus are generated for converting from each national currency to Euro. It should be appreciated that the action menu items are generated on a per source currency type basis. In this manner, many separate dropdown menus 36 may be generated, one for each source unit name. Moreover, a separate schema name is utilized for each source currency type. Additionally, these menus are also generated in the current user interface language.

From block 406, the routine 400 continues to block 408, where the action menu items for each schema are returned to the application program 205. According to one embodiment of the invention, the application program 205 displays the dropdown menu 36 in response to the selection of a currency value 32 or an indicator 34. However, it should be appreciated that the action plug-in 225 or other software component may be responsible for the display of the dropdown menu 36. The routine 400 continues from block 408 to block 410, where it ends.

Figure 5:
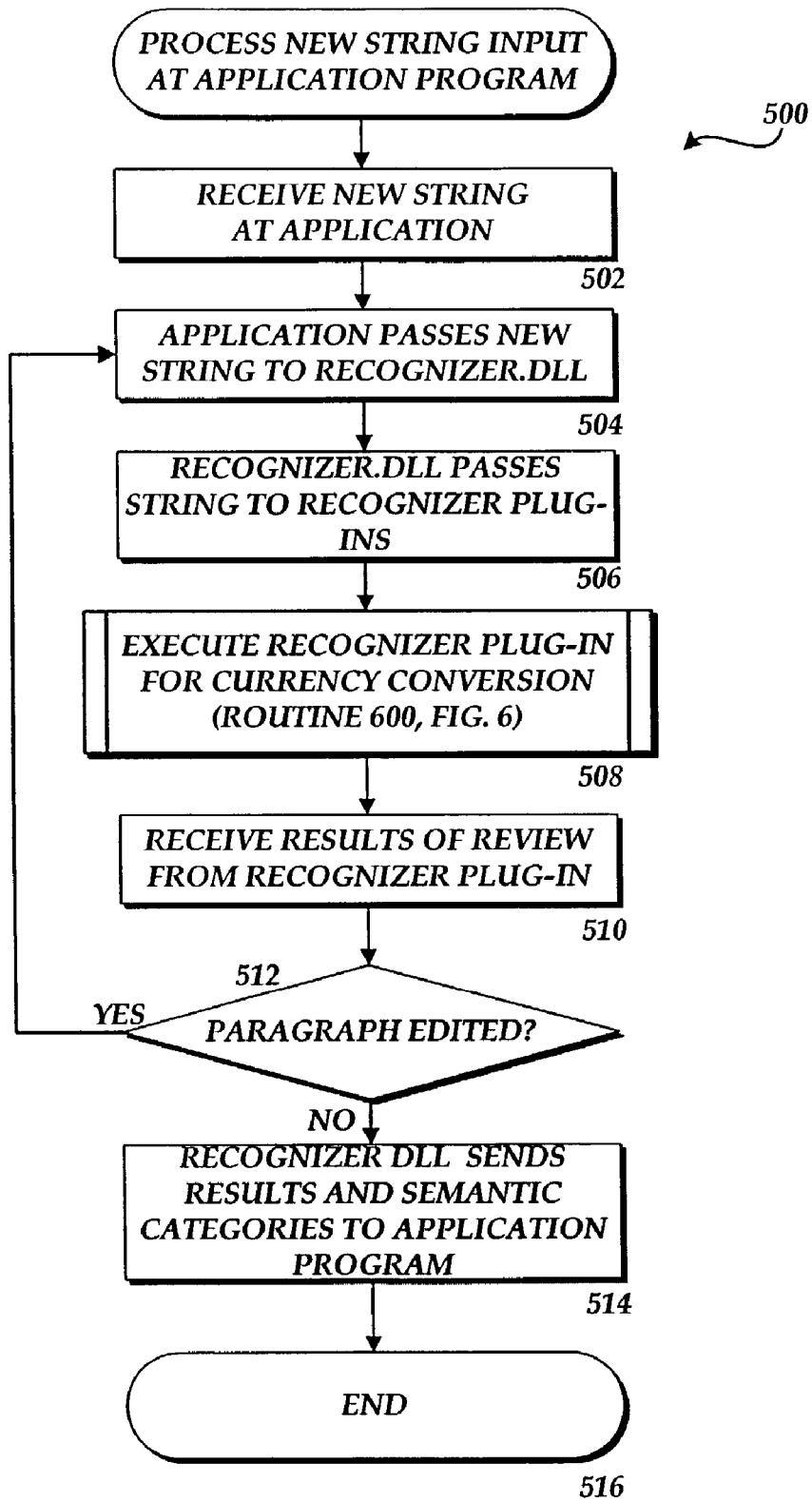
FIG. 5 is a flow diagram showing an illustrative routine for processing a string input provided at an application program according to one actual embodiment of the present invention.

Turning now to FIG. 5, an illustrative routine 500 will be described for processing the input of a new string at the application program 205. The routine 500 begins at block 502, where the application program 205 receives a new string, such as when a user enters a new paragraph into an electronic document, edits a previously entered paragraph, or enters a new value into a cell in a spreadsheet. From block 502, the routine 500 continues to block 504 where the application program 205 passes the new string to the recognizer DLL 210. As described above, the recognizer DLL 210 is responsible for communicating with the application program 205, managing the jobs that need to be performed by the recognizer plug-ins 220A-220N, receiving results from the recognizer plug-ins 220A-220N, and sending schema information to the application program module 205 for recognized currency values and source currency types. It should be understood that, in one embodiment of the invention, a paragraph is passed to the recognizer DLL 210 at block 504. However, in alternative embodiments, a sentence, the contents of a spreadsheet cell, a section of the document, the entire document, etc., may be passed to the recognizer DLL 210. In other words, it should be appreciated that the embodiments of the present invention are not limited to simply passing a paragraph to the recognizer DLL 210.

From block 504, the routine 500 continues to block 506, where the recognizer DLL 210 passes the string to the recognizer plug-ins 220A-220N. The routine 500 then continues to block 508 where the recognizer plug-ins are executed on the paragraph to recognize key words or characters within the string. In particular, the recognizer plug-in for converting currency values between currency types is executed on the string. An illustrative routine describing the operation of the recognizer plug-in for currency conversion is described below with reference to FIG. 6. At block 510, the results from the recognizer plug-in 220 are received at the recognizer DLL 210. The routine 500 then continues to block 512, where a determination is made by the recognizer DLL 210 as to whether the paragraph has been edited since the string was transmitted to the recognizer plug-ins 220A-220N. If the paragraph has been edited, the routine 500 returns to block 504, where the edited string is passed to the recognizer DLL 210. If the paragraph has not been edited, the routine 500 continues to block 514, where the recognizer DLL 210 sends the results received from the recognizer plug-in 220 to the application program 205. The routine 500 then continues to block 516, where it ends.

Figure 6:
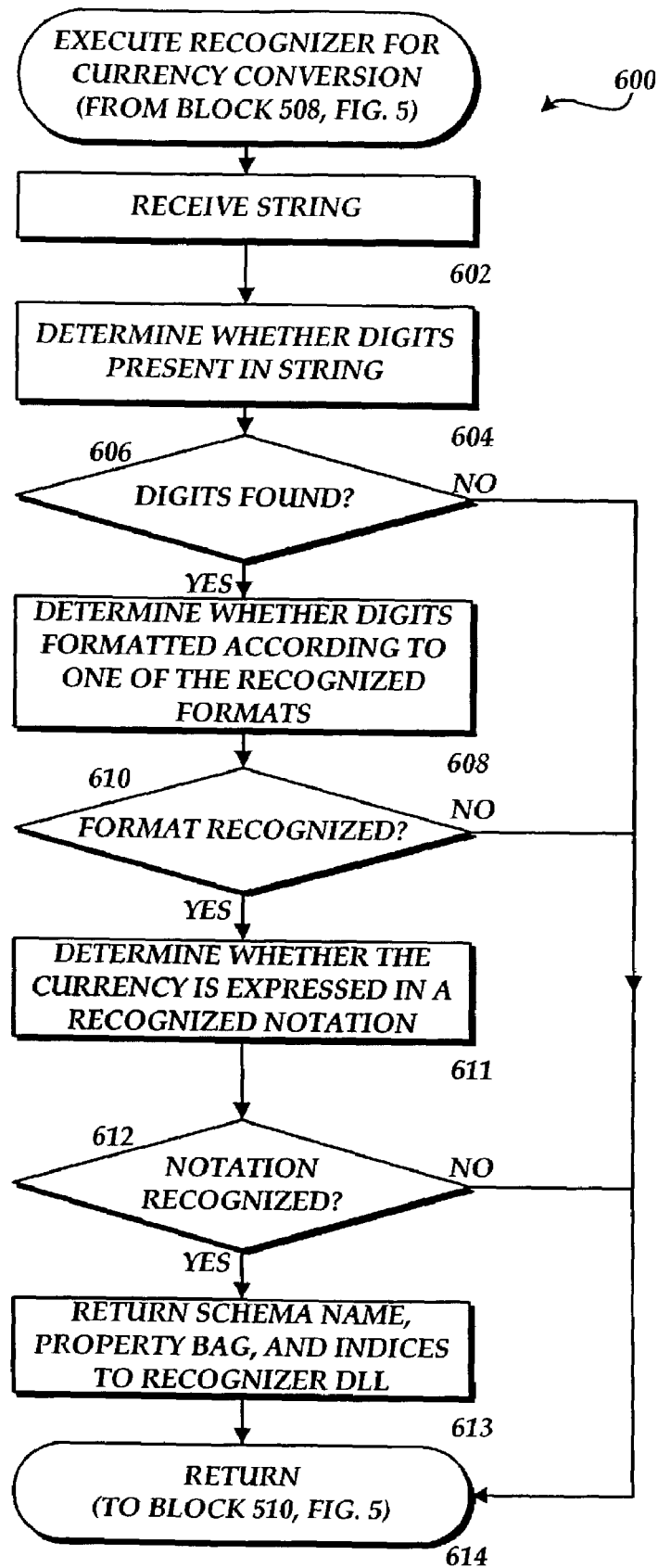
FIG. 6 is a flow diagram illustrating the operation of a recognizer plug-in software module provided according to one actual embodiment of the present invention.

Referring now to FIG. 6, an illustrative routine 600 will be described that illustrates the operation of the recognizer plug-in 220 for converting currency values according to one embodiment of the present invention. The routine 600 begins at block 602, where a string of text is received at the recognizer plug-in 220 from the recognizer DLL 210. The routine 600 then continues to block 604, where a determination is made as to whether the string of text contains numeric digits.

From block 604, the routine 600 continues to block 606, where a determination is made as to whether digits were found in the string of text. If no digits were found, the routine 600 branches from block 606 to block 614, where it returns to block 510, shown in FIG. 5. If, however, at block 606, it is determined that digits were found in the string of text, the routine 600 continues to block 608.

At block 608, the format of the digits is examined to determine whether the format matches one of the specified currency formats listed in the currency formats file 26. In particular, the arrangement of the decimal and separator characters utilized in the currency value may be examined and compared to the formats listed in the currency formats file 26. The routine 600 then continues to block 610.

At block 610, a determination is made as to whether the recognized currency value is formatted according to one of the recognized formats. If the currency value is not formatted in one of the recognized formats, the routine 600 branches to block 614, where it returns to block 510, shown in FIG. 5. If the currency value is formatted in one of the recognized formats, the routine 600 continues to block 611.

At block 611, a determination is made as to whether the recognized currency value is arranged according to one of the currency notations identified in the currency notations file 27. In particular, this process may involved scanning the text located prior to and after the digits to identify the notation. Once a notation has been identified, the source type of currency may also be identified. For instance, if the string of text includes the digits "10", followed by an "F", the recognizer will recognize this as one of the recognized notations for representing French francs. Schema information corresponding to the source type of currency is then associated with the recognized currency value.

If, at block 612, it is determined that the recognized currency value is not in one of the recognized notations, the routine 600 branches to block 614, where it returns to block 510, shown in FIG. 5. If, however, the currency value is expressed using one of the recognized notations, the routine 600 continues to block 613. At block 613, schema information is returned to the recognizer DLL 210. In particular, a schema name associated with the source currency type is returned to the recognizer DLL 210. Additionally, a "property bag" may also be returned to the recognizer DLL 210. The property bag is an object which stores information about the recognized currency value that may be utilized by the action plug-in 225. For instance, the property bag may include data identifying the format and notation for the currency value. Additionally, an index to the recognized currency value within the string of text may also be returned to the recognizer DLL 210. All of the information returned from the recognizer plug-in 220 to the recognizer DLL 210 may be subsequently passed to the action plug-in 225 and used in the conversion process. This is described in greater detail below with respect to FIGS. 7 and 8. From block 613, the routine 600 continues to block 614, where it returns to block 510, shown in FIG. 5.

Figure 7:
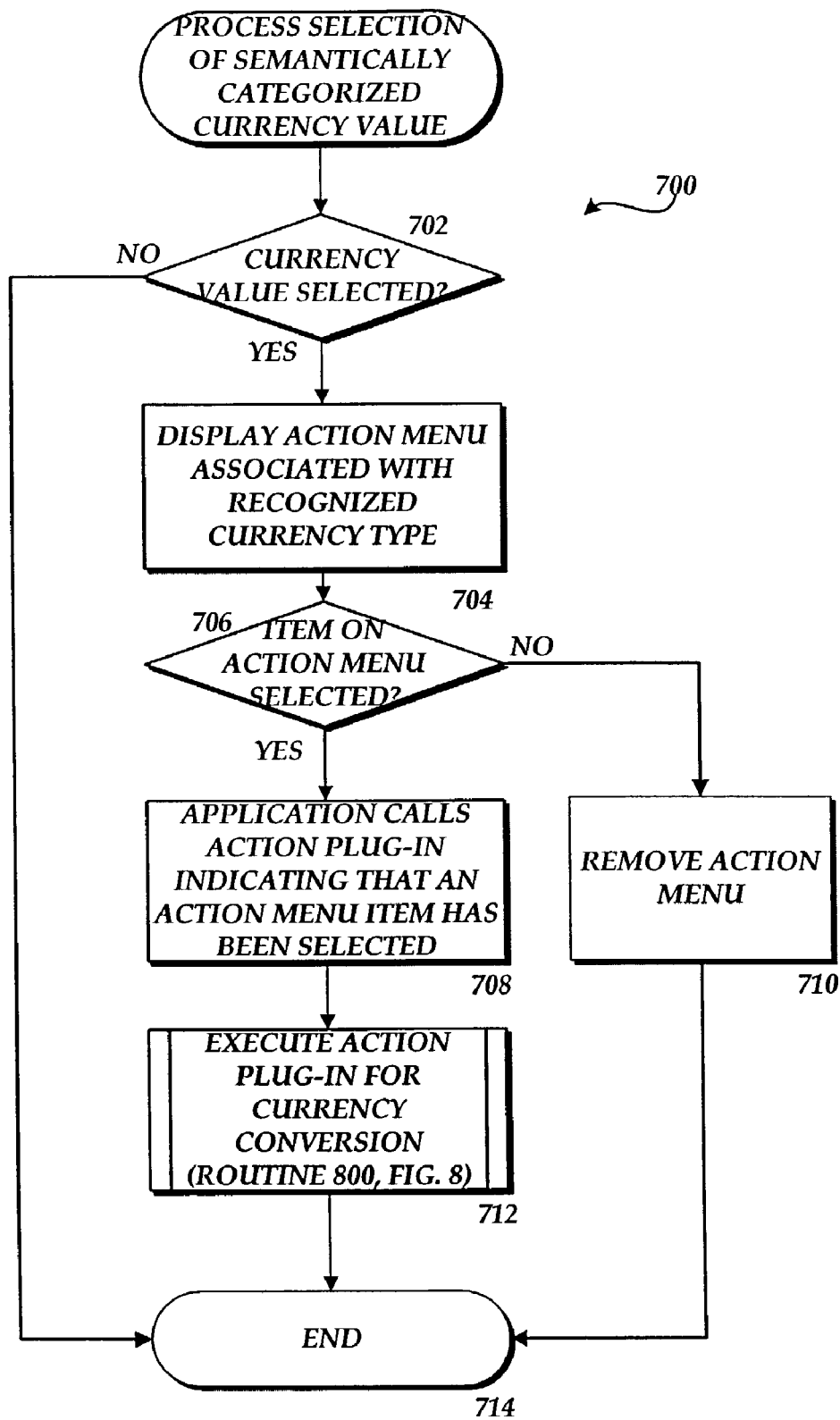
FIG. 7 is a flow diagram illustrating a routine for processing the selection of a semantically categorized currency value according to one actual embodiment of the present invention.

Referring now to FIG. 7, an illustrative routine 700 will be described for processing the selection of a semantically categorized currency value. As discussed above, once a currency value has been recognized within a string of text by the recognizer plug-in 220A, the currency value may be highlighted or an indication may be provided to the user indicating that the currency value has been recognized and that actions may be performed on the currency value. Accordingly, at block 702, a determination is made as to whether the currency value or indicator has been selected by a user. If the currency value has not been selected, the routine 700 continues to block 714, where it ends. If, however, the currency value or indicator has been selected, the routine 700 continues to block 704.

At block 704, the application program 205 displays the list of actions associated with the schema corresponding to the selected currency value. In this manner, the dropdown menu 36 described above with reference to FIGS. 3A-3F is presented to the user. The routine 700 then continues from block 704 to block 706, where a determination is made as to whether the user has selected one of the items from the list of actions. If the user has made the selection of a user interface item other than one of the items from the list of actions, the routine 700 branches to block 710, where the list of actions is removed. If, however, the user does select one of the items from the list of actions, the routine 700 continues to block 708.

At block 708, the application program 205 calls the action plug-in 225 corresponding to the appropriate schema type and indicates that an action item has been selected. The call from the application program 225 to the action plug-in 225 includes the schema name corresponding to the recognized currency value, the item number of the selected menu item, the name of the calling application program 205, a pointer into an object model provided by the application program 205 for accessing the document 24, the property bag described above with reference to FIG. 6, and the text of the recognized currency value. The routine 700 then continues to block 712, where the action plug-in for converting currency values is executed. An illustrative routine for executing the action plug-in 225 for currency conversion is described below with reference to FIG. 8. Once the action plug-in 225 has completed its execution, the routine 700 continues from block 712 to block 714, where it ends.

Figure 8:
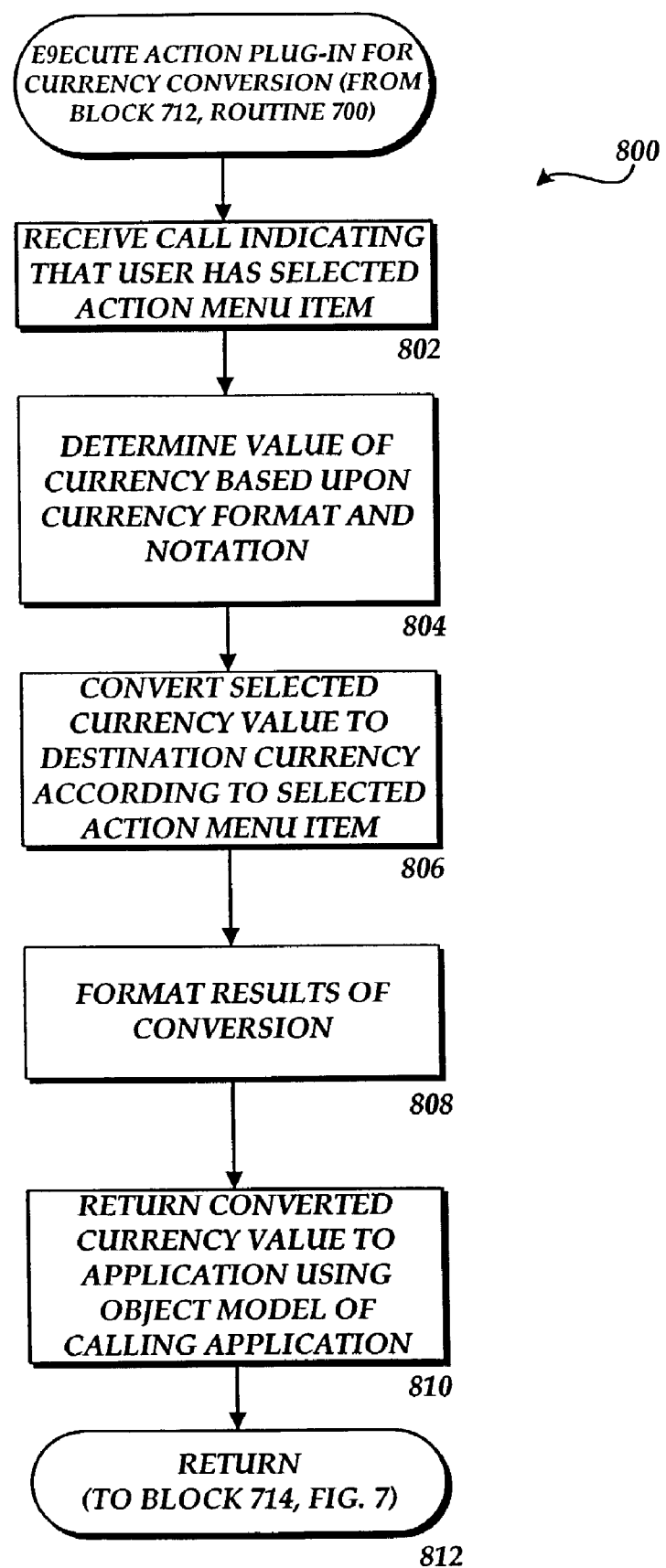
FIG. 8 is a flow diagram showing a routine for executing an action plug-in for converting currency values between currency types according to one actual embodiment of the present invention.

Referring now to FIG. 8, an illustrative routine 800 will be described for executing an action plug-in 225 for converting currency values. The routine 800 begins at block 802, where the action plug-in 225 receives a call from the action DLL 215 indicating that the user has selected an action menu item. From block 802, the routine 800 continues to block 804, where the action plug-in 225 determines the actual value of the recognized currency value in view of the format and notation that the currency value is expressed in. This is necessary because currency values expressed in different languages may include separator characters that have different meanings in different languages. For instance, a currency value may be expressed in French as "1,729", while in English it would be expressed as "1729." Therefore, the actual value of the currency value must be determined prior to performing the conversion operation.

From block 804, the routine 800 continues to block 806, where the recognized currency value is converted to the destination currency type according to the selected action menu item. In particular, the Euro conversion rules file 28 may be utilized to perform the actual conversion, including rounding and determining the appropriate number of significant digits.

From block 806, the routine 800 continues to block 808, where the converted currency value is formatted. The converted currency value may be formatted according to the regional format specified in the language settings of the application 205 or the operating system 16. Other types of formatting may also be applied to the converted currency value.

From block 808, the routine 800 continues to block 810 where the currency value in the string of text is replaced with the converted currency value. According to one embodiment of the present invention, the replacement is made by accessing a document object model provided by the application program 205. Through the document object model, the action plug-in 225 can directly access the document 24 and make changes therein. Details regarding the use of such a document object model are well known to those skilled in the art. Alternatively, the converted currency value may be displayed to the user in a dialog box or other type of user interface object. From block 810, the routine 800 continues to block 812, where it returns to block 714, described above with reference to FIG. 7.

Based on the foregoing, those skilled in the art should appreciate that various embodiments of the present invention provide a method, system, apparatus, and computer-readable medium for converting currency values based upon semantically labeled strings. The above specification, examples and data provide a complete description of the manufacture and use of the composition of the invention. Since many embodiments of the invention can be made without departing from the spirit and scope of the invention, the invention resides in the claims hereinafter appended.

We claim:

1. In a system for creating and editing an electronic document, a method for converting a currency value, the method comprising:

determining whether a string of text contained within the electronic document contains a currency value expressed in a source type of currency, wherein determining whether the string of text contained within the electronic document contains the currency value expressed in the source type of currency comprises utilizing a recognizer plug-in having a currency format file to recognize currencies expressions having different decimal and thousands separator symbols;

in response to determining that the string of text includes a currency value, semantically labeling the value with schema information identifying the source type of currency;

displaying the currency value and an indication that the currency value has been semantically labeled adjacent to the string of text;

providing a list of actions that may be performed on the currency value to convert the currency value to a destination type of currency, the list of actions identified based upon the schema information;

receiving a selection of an action from the list of actions; and generating a converted currency value by converting the currency value from the source type of currency to the destination type of currency identified by the selected action.

2. The method of claim 1, further comprising: replacing the currency value in the electronic document with the converted currency value.

3. The method of claim 2, wherein replacing the currency value in the electronic document with the converted currency value comprises utilizing a document object model provided by an application for editing the electronic document to replace the currency value in the electronic document with the converted currency value.

4. The method of claim 3, wherein the list of actions comprises a dropdown menu having one or more menu items corresponding to the list of actions that may be performed on the currency value to convert the currency value to the destination type of currency.

5. The method of claim 4, further comprising:
determining a current user interface language setting for the application; and
generating the menu items of the dropdown menu in a language specified by the current user interface language setting.

6. The method of claim 5, wherein the list of actions is provided in response to the selection of the currency value or the indication.

7. The method of claim 6, wherein the schema information comprises data uniquely corresponding to the source type of currency.

8. The method of claim 1, further comprising:
determining a value of the currency value prior to converting the currency value based upon a currency format and a currency notation used to express the currency value.

9. The method of claim 1, further comprising:
in response to determining that another string of text includes another currency value, semantically labeling the other value with schema information identifying a source type of the other currency;
displaying the other currency value and an indication that the other currency value has been semantically labeled adjacent to the other string of text.

10. The method of claim 9, further comprising:
providing a list of actions that may be performed on the other currency value to convert the other currency value to another destination type of currency, the list of actions identified based upon the schema information;
receiving a selection of an action from the list of actions; and
generating another converted currency value by converting the other currency value from the other source type of currency to the other destination type of currency identified by the selected action.

11. In a system for creating and editing an electronic document, a method for converting a currency value expressed in a source type of currency to a destination type of currency, the method comprising:
receiving a portion of the electronic document as a string of text;
analyzing the string of text to determine whether the string of text includes a currency value, wherein analyzing the string of text to determine whether the string of text includes a currency value comprises utilizing a currency format file to recognize currencies expressions utilizing different decimal and thousands separator symbols;
in response to determining that the string of text includes a currency value, semantically labeling the currency value with schema information identifying the source type of currency used to express the currency value, wherein the semantic label is associated with a single currency value;
displaying the currency value and an indication that the currency value has been semantically labeled adjacent to the string of text;
receiving a selection of the currency value;
in response to receiving the selection of the currency value, providing a list of actions that may be performed on the currency value to convert the value to the destination type of currency;
receiving the selection of an action from the list of actions;
in response to receiving the selection of an action, determining a value for the currency value based upon a currency format used to express the currency value;
generating a converted currency value by converting the value to the destination type of currency identified by the selected action; and
replacing the currency value with the converted currency value in the electronic document.

12. The method of claim 11, wherein the list of actions comprises a dropdown menu having one or more menu items corresponding to the list of actions that may be performed on the currency value to convert the currency value to the destination type of currency.

13. The method of claim 12, further comprising:
determining a current user interface language setting for an application program associated with the electronic document; and
generating the menu items of the dropdown menu in a language specified by the current user interface language setting.

14. A system for converting a currency value from a source type of currency to a destination type of currency, the system comprising:
a recognizer plug-in capable of:
receiving a portion of an electronic document as a string of text from an application program,
analyzing the string of text to determine whether the string of text includes a currency value, wherein analyzing the string of text to determine whether the string of text includes the currency value comprises utilizing a currency format file to recognize currencies expressions utilizing different decimal and thousands separator symbols, and in response to determining that the string of text includes a currency value, semantically labeling the currency value with schema information identifying the source type of currency, wherein the semantic label is associated with a single currency;

an application program for creating and editing the electronic document, the application program capable of displaying the string of text and an indication that the currency value has been semantically labeled, receiving a selection of the currency value, in response to receiving the selection of the currency value, providing a list of actions that may be performed on the currency value to convert the currency value to the destination type of currency, receiving the selection of an action from the list of actions, and providing the selected action and the currency value to an action plug-in; and an action plug-in capable of generating a converted currency value by converting the currency value to the destination type of currency identified by the selected action, and replacing the currency value in the electronic document with the converted currency value.

15. The system of claim 14, wherein the list of actions comprises a dropdown menu having one or more menu items corresponding to the list of actions that may be performed on the currency value to convert the currency value to the destination type of currency, and wherein the action plug-in is further operative to:

determine a current user interface language setting for the application program; and to generate the menu items of the dropdown menu in a language specified by the current user interface language setting.

16. The system of claim 15, wherein the source type of currency comprises the Euro and wherein the destination type of currency comprises one of a plurality of national currency types.

17. The system of claim 15, wherein the source type of currency comprises one of a plurality of national currency types and wherein the destination type of currency comprises the Euro.

18. The system of claim 15 wherein the application program comprises a spreadsheet application program, wherein the electronic document comprises a spreadsheet having one or more cells, and wherein the action plug-in is further operative to maintain a per cell undo stack, thereby permitting the replacement of converted currency values with currency values on a per cell basis.

* * * * *